United States Patent
Kitaura

(10) Patent No.: US 7,336,288 B2
(45) Date of Patent: Feb. 26, 2008

(54) SAMPLING RATE CONVERTING SYSTEM AND FILTERING METHOD

(75) Inventor: Masahiro Kitaura, Yokohama (JP)

(73) Assignee: Victor Company of Japan, Limited, Yokohama, Kanagawa-ken (JP)

( * ) Notice: Subject to any disclaimer, the term of this patent is extended or adjusted under 35 U.S.C. 154(b) by 522 days.

(21) Appl. No.: 11/091,952

(22) Filed: Mar. 29, 2005

(65) Prior Publication Data

US 2005/0219275 A1    Oct. 6, 2005

(30) Foreign Application Priority Data

Mar. 30, 2004  (JP)  ............................ P2004-097764
Feb. 2, 2005   (JP)  ............................ P2005-025813

(51) Int. Cl.
*G09G 5/02*    (2006.01)

(52) U.S. Cl. ...................... 345/694; 345/690; 345/604; 348/396.1

(58) Field of Classification Search ................ 345/690, 345/694, 698, 699, 212, 213, 600, 603, 604, 345/3.1–3.4; 348/390, 391.1, 392.1, 393.1, 348/396.1, 667, 668, 708, 712, 716, 717

See application file for complete search history.

(56) References Cited

U.S. PATENT DOCUMENTS 5,526,051 A *  6/1996  Gove et al. ............ 375/240.01
6,330,344 B1 * 12/2001  Kondo et al. ................ 382/107
6,734,921 B1 *  5/2004  McIntyre et al. ........... 348/708

FOREIGN PATENT DOCUMENTS

JP    2003-187243    7/2003
WO    WO 01/52533 A2    7/2001

* cited by examiner

*Primary Examiner*—Jimmy H. Nguyen
(74) *Attorney, Agent, or Firm*—The Nath Law Group; Jerald L. Meyer; Stanley N. Protigal

(57) ABSTRACT

A high-definition luminance signal Y1 is converted into a luminance signal Y2 of a rate (subpixel sampling rate) corresponding to the number of subpixels in the horizontal direction on a display by a subpixel number-of-pixel converter. The luminance signal Y1 is converted into a luminance signal Y3 of a sampling rate of the display by a number-of-pixels-in-pixel-units converter. The luminance signal Y2 and the luminance signal Y3 are mixed by a mixer, and a luminance signal having a frequency characteristic located between a frequency characteristic of the luminance signal Y2 and a frequency characteristic of the luminance signal Y3 is output. A mixing rate of the mixer is controlled according to a control value that is generated by an image feature detecting portion.

7 Claims, 27 Drawing Sheets

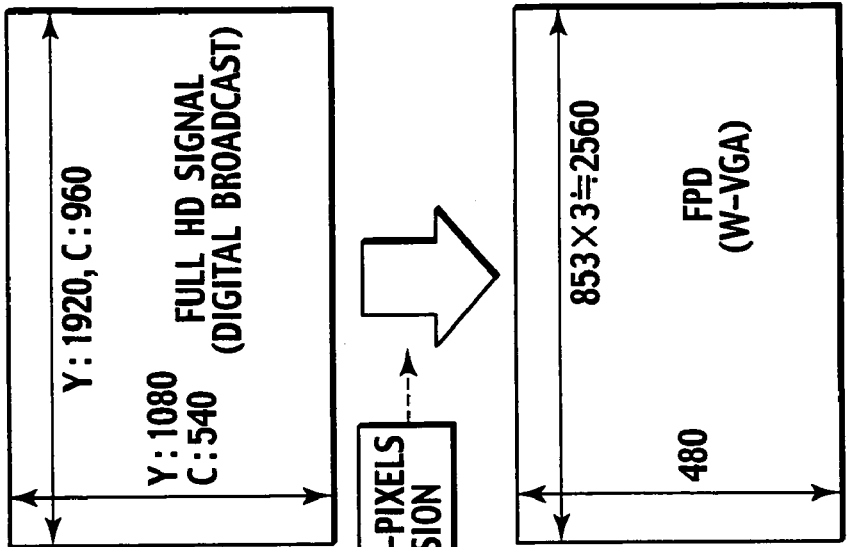

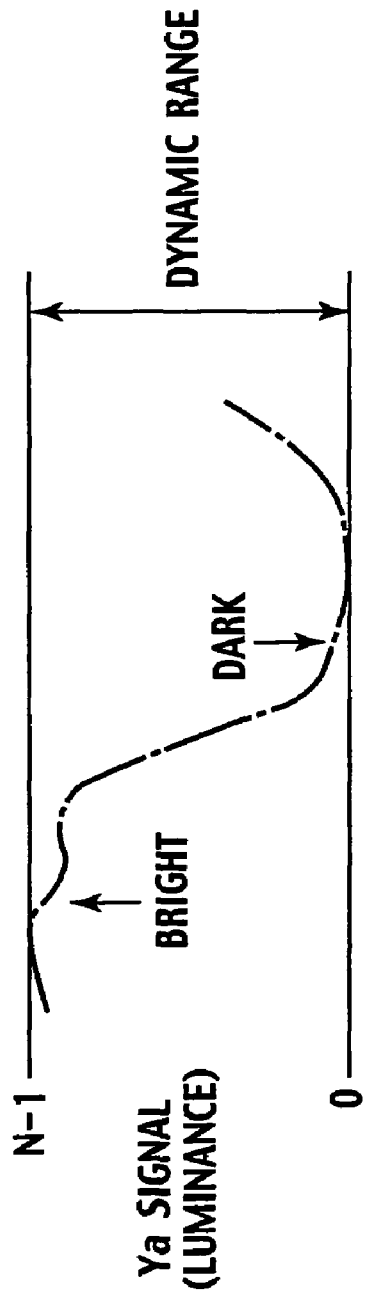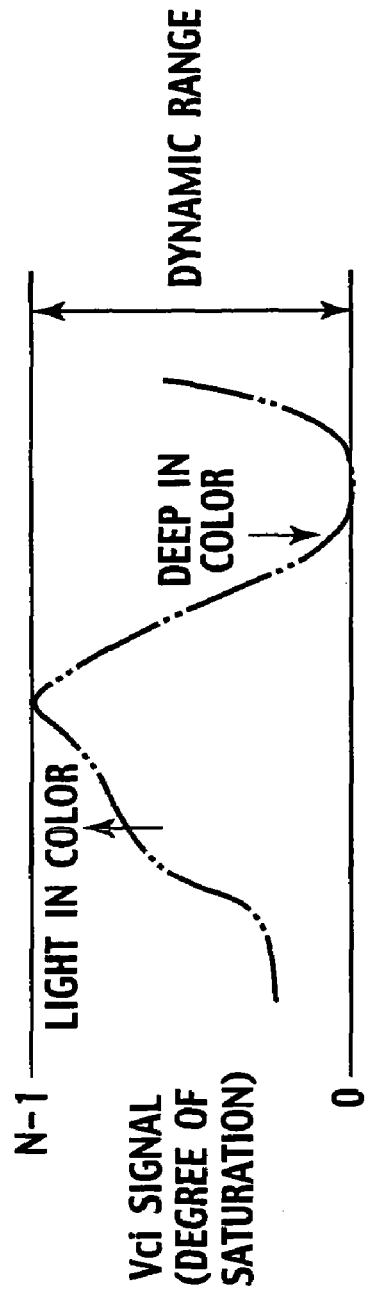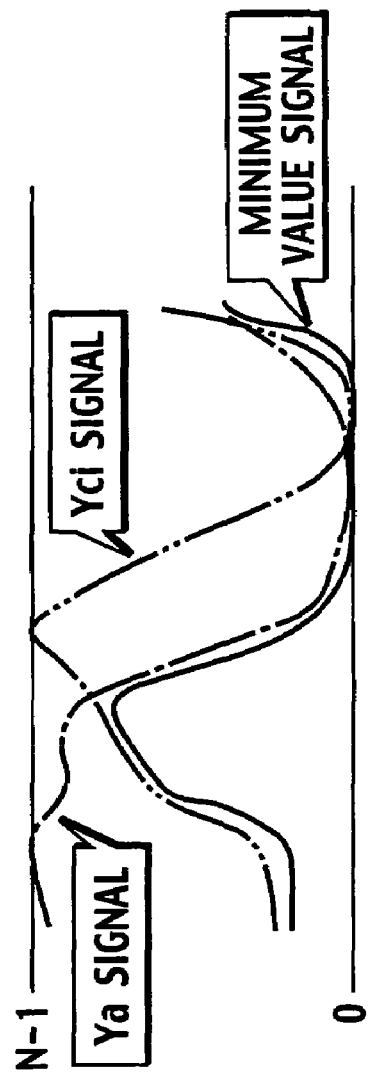

SAMPLING RATE CONVERTING SYSTEM AND FILTERING METHOD

BACKGROUND OF THE INVENTION

1. Field of the Invention

The present invention relates to a sampling rate converting system for applying a sampling rate conversion to an input image signal to display the input image signal on a display on which pixels each formed of a plurality of subpixels are arranged in a matrix fashion, and a filtering method applied to the sampling rate converting system.

2. Description of the Related Art

Out of various display devices (displays), in the display in which the pixels are arranged in a matrix fashion and are caused to emit the light in predetermined sequence, each pixel corresponds to each signal data value. For example, the flat panel display (FPD) such as PDP (Plasma Display Panel), LCD (Liquid Crystal Display), and the like applies to such display.

In these displays, as shown in FIG. 1A, three light emitting elements (subpixels) corresponding to three primary colors of R(red), G(green), B(blue) are aligned, and the luminance and the color are reproduced while using these elements as one pixel. Then, as shown in FIG. 2, the image display device having such display includes a number-of-pixels converting portion 101, a matrix portion (YUV→RGB) 102, and a panel 106. The number-of-pixels converting portion 101 adapts the number of pixels of an input signal to the number of pixels of the display based on the number-of-pixels conversion. In some cases the number of pixels of the signal agrees with the number of pixels of the display. However, since the signal source is diverse nowadays, such number-of-pixels converting portion 101 is substantially indispensable to the display.

Here the input signals consists of the luminance signal Y and the color difference signals U, V as the transmission signals for the television. In the color difference signals (U, V signals) as the standard signal (SD signal) based on NSTC (National Television Standard Committee), or the like, the color difference signal (B-Y) is called Cb and also the color difference signal (R-Y) is called Cr. Also, in the high definition signal (HD signal), the color difference signal (B-Y) is called Pb and also the color difference signal (R-Y) is called Pr. Since the transmission matrix coefficient values are different between the standard signal and the high definition signal in connection with the colorimetry parameter, the color difference signals are distinguished one from the other. Now, as the general name of the color difference signals, the color difference signal (B-Y) is called a color difference signal U and also the color difference signal (R-Y) is called a color difference signal V.

The input signals Y, U, V are subjected to the number-of-pixels conversion by the number-of-pixels converting portion 101, then are converted into the RGB signals by the matrix portion 102, and then are transferred to the panel 106. The panel 106 has a memory function, and respective pixels on the panel 106 emit light according to respective signal data values. Here, the memory function of the panel 106 is accomplished by a physical memory function of the panel 106 and an electronic frame or line memory, and signifies that RGB pixel data 103, 104, 105 reproduce a tone to correspond to respective pixels on a one-to-one basis.

FIG. 3A is a view showing the model applied to the number-of-pixels conversion in a prior art. Here high-definition luminance signals in one frame, which consists of 1920 pixels in the horizontal direction and 1080 pixels in the vertical direction, are converted to correspond to a display, which consists of 853 pixels in the horizontal direction and 480 pixels in the vertical direction.

As the frequency characteristic after the number-of-pixels conversion when the horizontal direction is observed, as shown in FIG. 4A, the sampling frequency (sampling rate) is given as 853 cycle/line (abbreviated to "cpL" hereinafter) and also the Nyquist limit, which is defined as an upper limit of a reproducible range of the signal, is given as almost 427 cpL, which is ½ of the sampling frequency, based on the sampling theorem. In contrast, the sampling frequency of the high-definition signals before the number-of-pixels conversion is given as 1920 cpL and also the Nyquist limit is given as 960 cpL.

FIG. 5 is a view explaining the concept of the number-of-pixels conversion in the prior art. In FIG. 5, the sampling frequency of the high-definition luminance signal is converted from 1920 cpL to 853 cpL. At this time, the filtering process for suppressing an aliasing to attain phase matching is carried out. Similarly the sampling frequency conversion and the filtering process are applied to the color difference signals. Here, in compliance with normal transmission signals, the sampling frequency thereof is set to a sampling frequency (960 cpL) that is ½ of that of the luminance signal. In some cases the color difference signals have the same number-of-pixels (sampling frequency) as the luminance signal.

Then, in case the filtering characteristics in the number-of-pixels conversion are extended to the high frequency range, the aliasing occurs about the Nyquist limit and acts as the interference, as shown in FIG. 4A. If the bandwidth in the number-of-pixels conversion is suppressed to avoid generation of the aliasing, the resolution is deteriorated and the picture quality is worsened.

In Japanese Patent Application Laid-open No. 2003-187243, a display method utilizing three subpixels of RGB to improve display quality is set forth. According to this method, different brightness components are applied to three subpixels constituting one pixel. As a result, brightness information can be reflected in the produced image in units of subpixel, and thus the display quality can be improved.

Also, in Japanese Patent Application Laid-open(KOHYO) No. 2003-520507, a method utilizing subpixels in the conversion from the standard definition (SD) signal to the high definition television (HDTV) signal is set forth. According to this method, when an edge of an image is sensed during the signal conversion from the SD signal to the HDTV signal, the transient characteristic of the luminance signal can be improved at a subpixel level.

However, in the methods set forth in Japanese Patent Application Laid-open No. 2003-187243 and Japanese Patent Application Laid-open(KOHYO) No. 2003-520507, the number-of-pixels conversion applied when the number of pixels of the input image signal (signal source) is larger than the number of pixels of the display is not taken into account at all. As a consequence, even though the methods set forth in Japanese Patent Application Laid-open No. 2003-187243 and Japanese Patent Application Laid-open (KOHYO) No. 2003-520507 are applied, as they are, to the number-of-pixels conversion applied when the number of pixels of the input image signal is larger than the number of pixels of the display, the problem such as generation of the above aliasing interference or deterioration of the image cannot be overcome.

SUMMARY OF THE INVENTION

The present invention has been made in view of above respects, and it is an object of the present invention to provide a sampling rate converting system capable of executing a sampling rate conversion to get a high-quality converted image while suppressing generation of an aliasing interference during the number-of-pixels conversion applied when the number of pixels of an input image signal is larger than the number of pixels of a display device, and a filtering method applied to the sampling rate converting system.

In order to attain the above object, there is provided a sampling rate converting system for executing a conversion of a sampling rate of an image signal input into such a display that respective pixels each consisting of a plurality of subpixels are arranged in a matrix fashion and also respective pixels emit a light in response to a signal data corresponding to respective pixels to reproduce a luminance or a color every pixel, the system comprising: a subpixel number-of-pixel converter (1) that inputs a high-definition image signal whose number of pixels is larger than a number of pixels of the display, and outputs a subpixel sampling rate signal (Y2) by converting a sampling rate (1920 cpL) of the high-definition image signal into a subpixel sampling rate (2560 cpL) based on a sampling rate (853 cpL) in a direction along which the subpixels on the display are aligned and a number (3) of subpixels constituting the pixel; a number-of-pixels-in-pixel-units converter (2) that inputs the high-definition image signal, and applies a number-of-pixels converting process to the input high-definition image signal in units of pixel to output an interference suppressing signal (Y3); an image feature detector (4) that senses a particular waveform pattern of a luminance signal or color difference signals constituting the high-definition image signal to output a control signal (α); and a mixer (5) that mixes the subpixel sampling rate signal (Y2) and the interference suppressing signal (Y3) and controls a mixing rate thereof according to the control signal (α).

According to the present invention, the sampling rate of the high-definition image signal whose number of pixels is larger than the number of pixels of the display is converted into the subpixel sampling rate. Therefore, the Nyquist limit can be improved and there is no necessity to suppress the signal band of the high-definition signal, which exceeds the number of pixels of the display, by a filter. As a result, even if the number of pixels of the input image signal is larger than the number of pixels of the display, a high-quality converted picture can be obtained while suppressing generation of any aliasing interference.

In addition, the image signal that is converted into the subpixel sampling rate and the interference suppressing signal that is subjected to the number-of-pixels converting process in units of pixel are mixed, and the mixing rate can be controlled according to the control signal that is output based on the particular waveform pattern of the luminance signal or the color difference signals constituting the input image signal. The bandwidth of the interference suppressing signal that is subjected to the number-of-pixels converting process in units of pixel is suppressed, and thus the pseudo color interference is not generated. As a result, if the interference suppressing signal that is subjected to the number-of-pixels converting process in units of pixel is output preferentially in locations where the particular waveform pattern is sensed, the high-quality converted picture can be obtained while suppressing the generation of the pseudo color interference.

Also, in order to attain the above object, there is provided a sampling rate converting system for executing a conversion of a sampling rate of an image signal input into such a display that respective pixels each consisting of a plurality of subpixels are arranged in a matrix fashion and also respective pixels emit a light in response to a signal data corresponding to respective pixels to reproduce a luminance or a color every pixel, the system comprising: a subpixel number-of-pixel converter (1) that inputs a high-definition image signal whose number of pixels is larger than a number of pixels of the display, and outputs a subpixel sampling rate signal (Y2) by converting a sampling rate (1920 cpL) of the high-definition image signal into a subpixel sampling rate (2560 cpL) based on a sampling rate (853 cpL) in a direction along which the subpixels on the display are aligned and a number (3) of subpixels constituting the pixel; a subpixel oversampling filter (8) that applies a filtering process to the subpixel sampling rate signal (Y2) at the subpixel sampling rate (2560 cpL) to output an interference suppressing signal (Y3'); an image feature detector (4a) that senses a particular waveform pattern of a luminance signal or color difference signals constituting the high-definition image signal to output a control signal (α); and a mixer (5) that mixes the subpixel sampling rate signal (Y2) and the interference suppressing signal (Y3') and controls a mixing rate thereof according to the control signal (α).

According to the present invention, the sampling rate of the high-definition image signal whose number of pixels is larger than the number of pixels of the display is converted into the subpixel sampling rate. Therefore, the Nyquist limit can be improved and there is no necessity to suppress the signal band of the high-definition signal, which exceeds the number of pixels of the display, by a filter. As a result, even if the number of pixels of the input image signal is larger than the number of pixels of the display, a high-quality converted picture can be obtained while suppressing generation of any aliasing interference.

In addition, the image signal that is converted into the subpixel sampling rate and the interference suppressing signal that is subjected to the filtering process by the subpixel oversampling filter are mixed, and the mixing rate can be controlled according to the control signal that is output based on the particular waveform pattern of the luminance signal or the color difference signals constituting the input image signal. The bandwidth of the interference suppressing signal that is subjected to the filtering process by the subpixel oversampling filter is suppressed, and thus the pseudo color interference is not generated. As a result, if the interference suppressing signal that is subjected to the filtering process by the subpixel oversampling filter is output preferentially in locations where the particular waveform pattern is sensed, the high-quality converted picture can be obtained while suppressing the generation of the pseudo color interference.

In preferred embodiment of the present invention, the image feature detector (4) includes a feature signal generating unit (41 to 44) that generates a feature signal (Ma) according to a level of the luminance signal and a degree of saturation of the color difference signals, and a filtering processing unit (45, 46) that outputs the control signal (α) by applying the filtering process to the feature signal (Ma) output from the feature signal generating unit (41 to 44).

According to this embodiment, the feature signal is generated according to the level of the luminance signal and the degree of saturation of the color difference signals, and then the control signal is output by applying the filtering process to the feature signal. Since the noticeable feature of the pseudo color interference is different dependent on the level of the luminance signal and the degree of saturation of the color difference signals, the high-definition converted picture quality in which the pseudo color interference is hard to be conspicuous can be obtained by generating the feature signal according to the level of the luminance signal and the degree of saturation of the color difference signals.

In preferred embodiment of the present invention, the feature signal generating unit (41 to 44) generates the feature signal (Ma) such that the mixing rate of the interference suppressing signal in the mixer (5) is increased as the level of the luminance signal is increased and the degree of saturation of the color difference signals is decreased.

According to this embodiment, the mixing rate of the interference suppressing signal in the mixer is increased as the level of the luminance signal is increased and the degree of saturation of the color difference signals is decreased. Therefore, the good converting characteristic can be obtained particularly in the natural image.

Also, in order to attain the above object, there is provided a filtering method applied to a sampling rate converting system that executes a conversion of a sampling rate of an image signal input into such a display that respective pixels each consisting of a plurality of subpixels are arranged in a matrix fashion and also respective pixels emit a light in response to a signal data corresponding to respective pixels to reproduce a luminance or a color every pixel, the method comprising: generating a subpixel sampling rate signal by converting a sampling rate (1920 cpL) of a high-definition image signal, whose number of pixels is larger than a number of pixels of the display, into a subpixel sampling rate (2560 cpL) based on a sampling rate (853 cpL) in a direction along which the subpixels on the display are aligned and the subpixel sampling rate (2560 cpL) a number (3) of subpixels constituting the pixel; calculating a weighted mean signal of the subpixel sampling rate signal in units of pixel; generating an output signal by mixing the subpixel sampling rate signal and the weighted mean signal; and controlling a filtering characteristic by changing a rate ($\alpha$) of the mixture.

According to the present invention, the sampling rate of the high-definition image signal whose number of pixels is larger than the number of pixels of the display is converted into the subpixel sampling rate. Therefore, the Nyquist limit can be improved and there is no necessity to suppress the signal band of the high-definition signal, which exceeds the number of pixels of the display, by a filter. As a result, even if the number of pixels of the input image signal is larger than the number of pixels of the display, a high-quality converted picture can be obtained while suppressing generation of any aliasing interference.

In addition, the image signal that is converted into the subpixel sampling rate and the signal that is derived by applying the weighted mean to the signal, which is converted into the subpixel sampling rate, in units of pixel are mixed, and the filtering characteristic can be varied by changing the mixing rate. The signal to which the weighted means is applied every pixel does not generate the pseudo color interference if a weighting in the weighted means is set appropriately. As a result, if the image signal that is converted into the subpixel sampling rate and the signal that is derived by applying the weighted mean to the signal, which is converted into the subpixel sampling rate, in units of pixel are mixed at an appropriate mixing rate, the high-quality converted picture can be obtained while suppressing the generation of the pseudo color interference.

The nature, principle and utility of the invention will become more apparent from the following detailed description when read in conjunction with the accompanying drawings.

BRIEF DESCRIPTION OF THE DRAWINGS

In the accompanying drawings:

FIGS. 3A and 3B are views showing models applied to convert the number of pixels in the prior art and the present invention respectively;

FIGS. 13A to 13C are waveform diagrams explaining processes in a feature detecting mixer shown in FIG. 11;

DESCRIPTION OF THE PREFERRED EMBODIMENTS

Embodiments of the present invention will be explained with reference to the drawings hereinafter.

First Embodiment

First, the number-of-pixels conversion executed in the subpixel rendering technology applied to a sampling rate converting system according to a first embodiment of the present invention (referred to as a "number-of-pixels conversion of subpixel" hereinafter) will be explained with reference to the drawings hereunder.

Figure 1A:
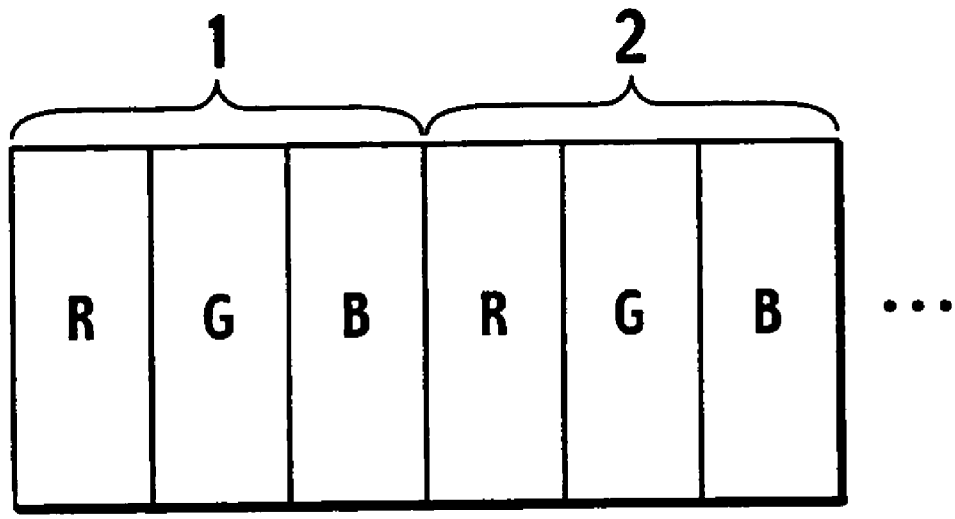
FIGS. 1A and 1B are views showing a relationship between one pixel and light emitting elements (subpixels)
Figure 1B:
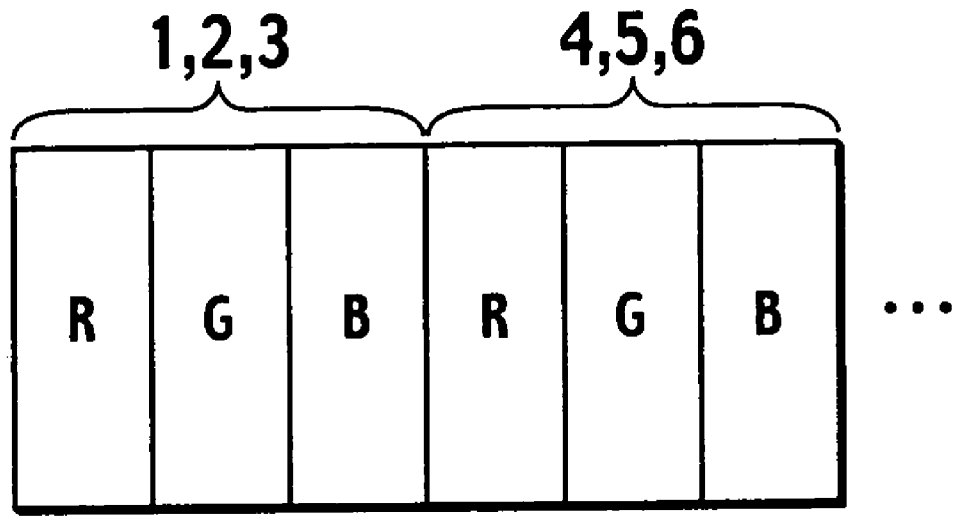

Normally one pixel consists of three subpixels of RGB, as shown in FIG. 1A. In contrast, the subpixel rendering technology considers each subpixel as one pixel and reproduces the luminance every subpixel, as shown in FIG. 1B.

FIG. 3B is a view showing a model of number-of-pixels conversion of subpixel to display the high definition image the number of pixels of which is larger than the number of pixels of the display. Here, since respective subpixels of RGB are aligned in sequence along the horizontal direction, the number of pixels in the horizontal direction is given as 2560 pixels (≈853×3 pixels). This correspond to the number of subpixels in the strict sense. However, in the number-of-pixels conversion of subpixel, each subpixel is considered as one pixel that can reproduce the luminance to execute the number-of-pixels conversion.

Figure 4B:
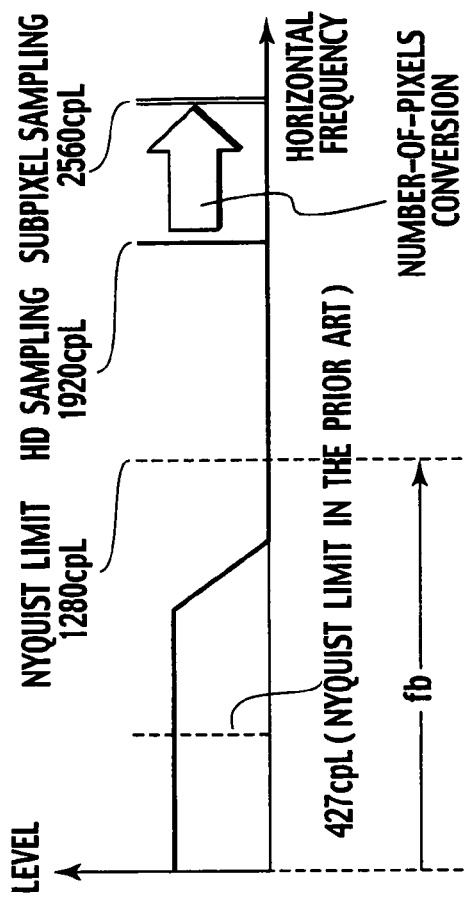
FIGS. 4A and 4B are views showing frequency characteristics in a number-of-pixels conversion in the prior art and the present invention respectively.
Figure 4A:
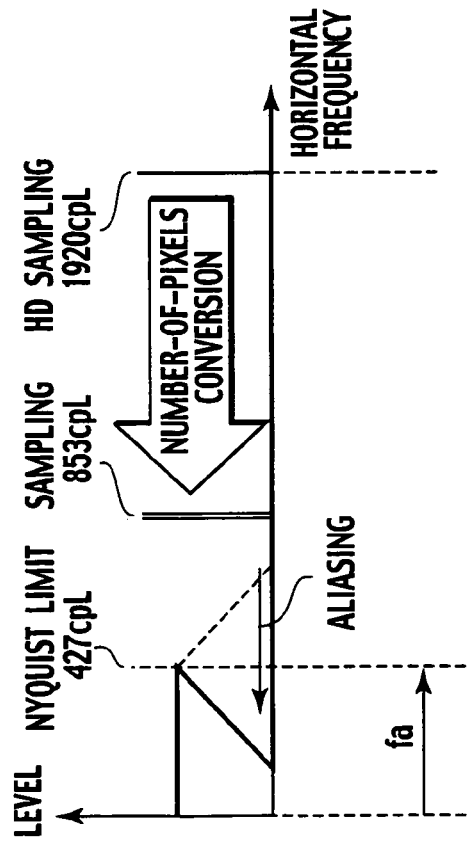
Figure 5:
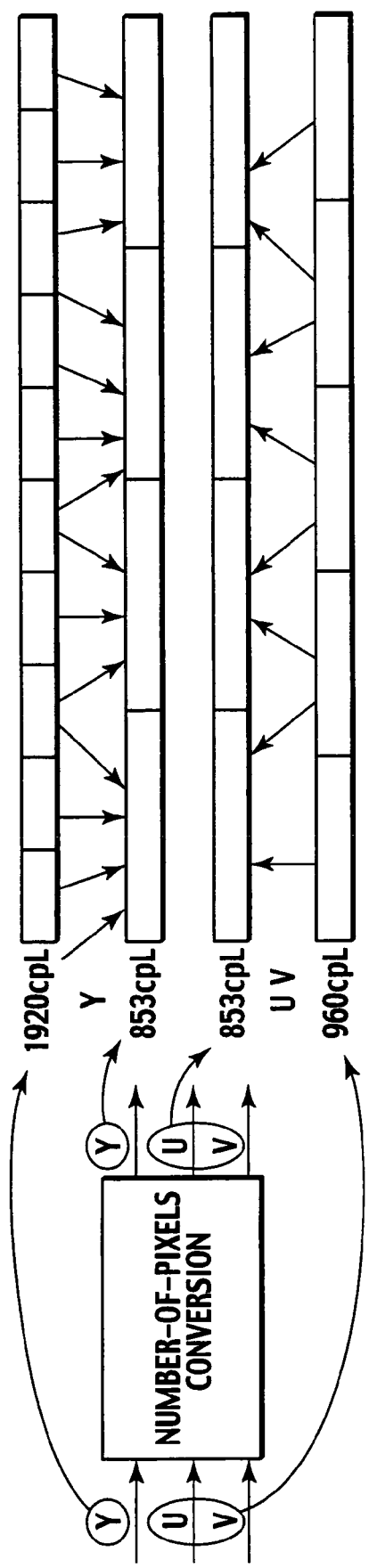
FIG. 5 is a view explaining the concept of the number-of-pixels conversion in the prior art.

FIG. 4B is a view showing the frequency characteristic of the number-of-pixels conversion of subpixel in the horizontal direction. In the number-of-pixels conversion of subpixel, the sampling frequency is converted from 1920 cpL, which is the sampling frequency of the high definition signal, to 2560 cpL. In other words, the sampling frequency is down-sampled from 1920 cpL to 853 cpL in the number-of-pixels conversion in the prior art, while the sampling frequency is up-sampled from 1920 cpL to 2560 cpL in the number-of-pixels conversion of subpixel.

Figure 6:
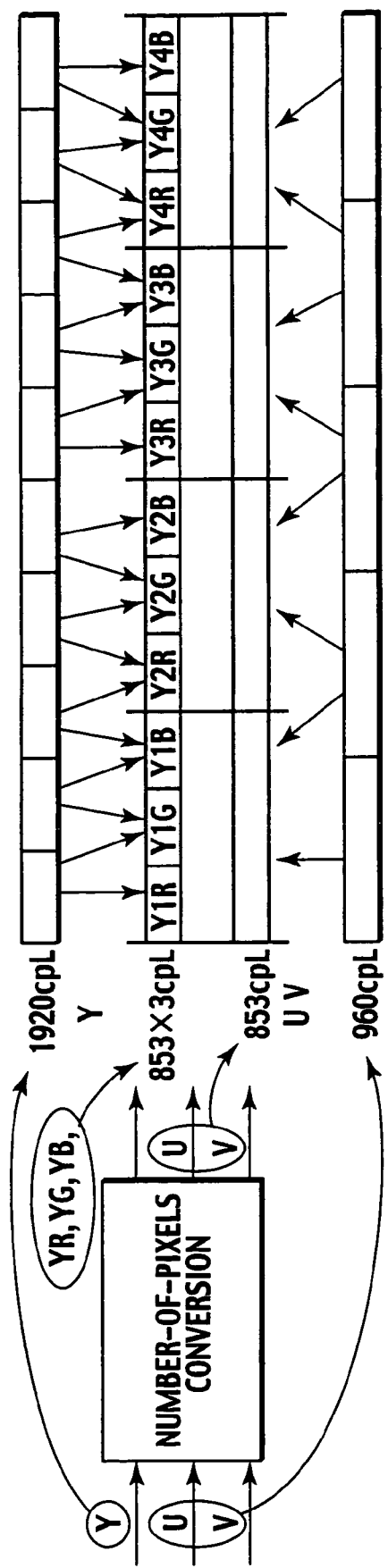
FIG. 6 is a view explaining the concept of number-of-pixels conversion of subpixel.

In the number-of-pixels conversion of subpixel, as shown in FIG. 6, the luminance signals (Y1R, Y1G, Y1B, . . . ) each corresponding to each subpixel of RGB constituting one pixel in the prior art are generated by the filtering process in the number-of-pixels conversion.

Figure 7:
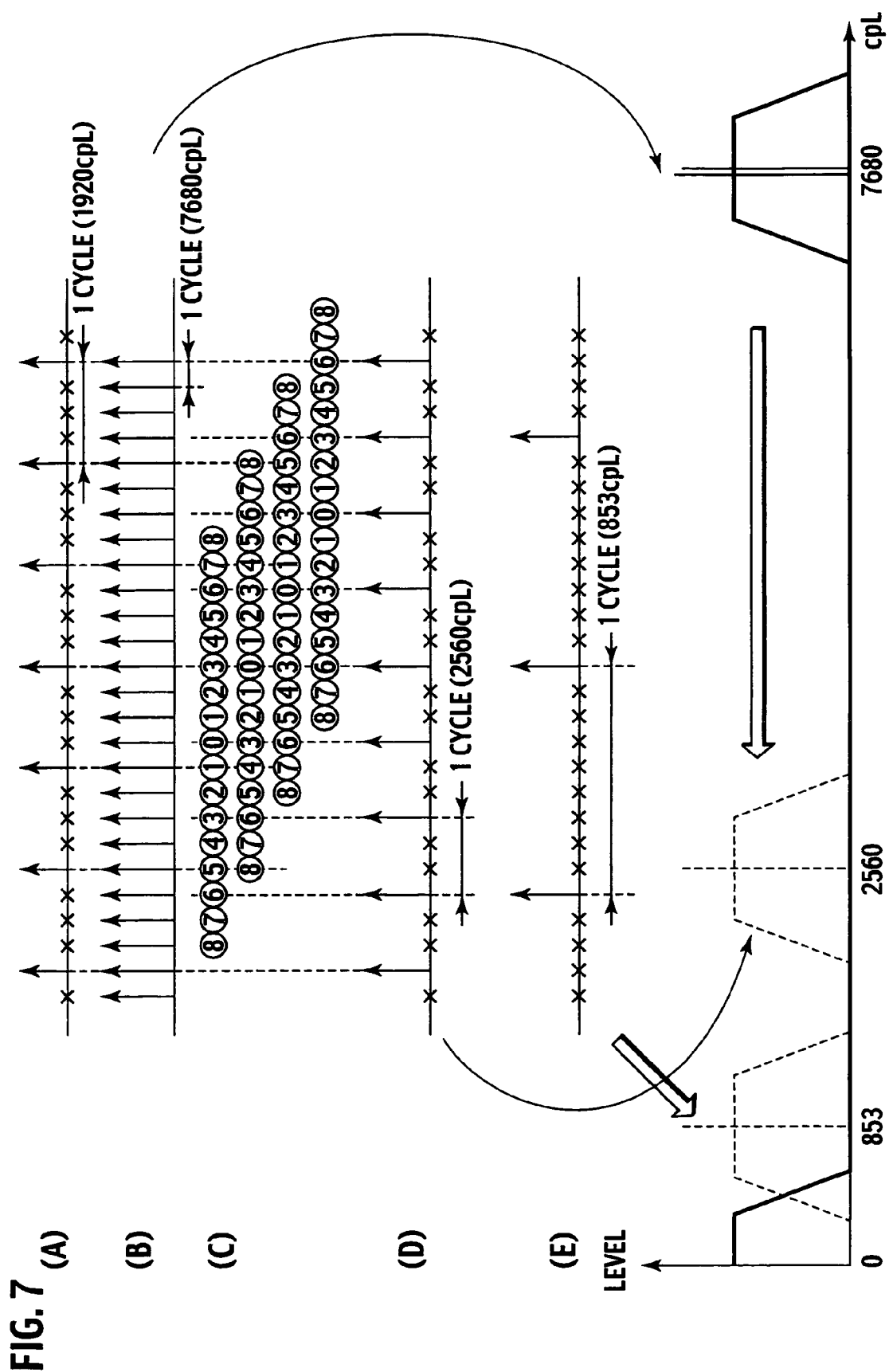
FIG. 7 is a view explaining in detail the number-of-pixels conversion of subpixel.

FIG. 7 is a view explaining in detail the number-of-pixels conversion of subpixel. In FIG. 7, a signal corresponding to each pixel is indicated by "↑". (A) of FIG. 7 represents the signal of 1920 cpL before the number-of-pixels conversion, and (D) of FIG. 7 represents the signal of 2560 cpL after the number-of-pixels conversion. Here, a ratio of the number-of-pixels conversion before and after the conversion is 3:4, which is a relatively simple ratio. The number-of-pixels conversion becomes a complicated process depending on a ratio of the number of pixels between a display and a high definition signal, but the same principle of the number-of-pixels conversion of subpixel can be applied to them.

Also, there are some cases where the number-of-pixels conversion of subpixel is applied to pixels that are slightly larger in number than pixels of a display and then the excessive pixels are discarded on the display screen. This approach corresponds to an over scan in a CRT (Cathode Ray Tube), and is within an anticipated scope of the subpixel conversion handled herein.

Then, (B) of FIG. 7 represents the signal of 7680 cpL. This signal is a least common multiple of both 1920 cpL before the conversion and 2560 cpL after the conversion, and is interpolated by a predetermined digital filter in compliance with four types of signal phases shown in (C) of FIG. 7. The luminance signal after the number-of-pixels conversion can be derived by extracting signals with desired phases (2560 cpL) from the signal shown in (B) of FIG. 7. In this case, (E) of FIG. 7 represents the converted signal, which is derived by the number-of-pixels conversion executed in units of pixel in the prior art, based on the number of pixels of the display in the horizontal direction. Also, the frequency bands of respective signals are shown on the lower side of (E) of FIG. 7.

Figure 8:
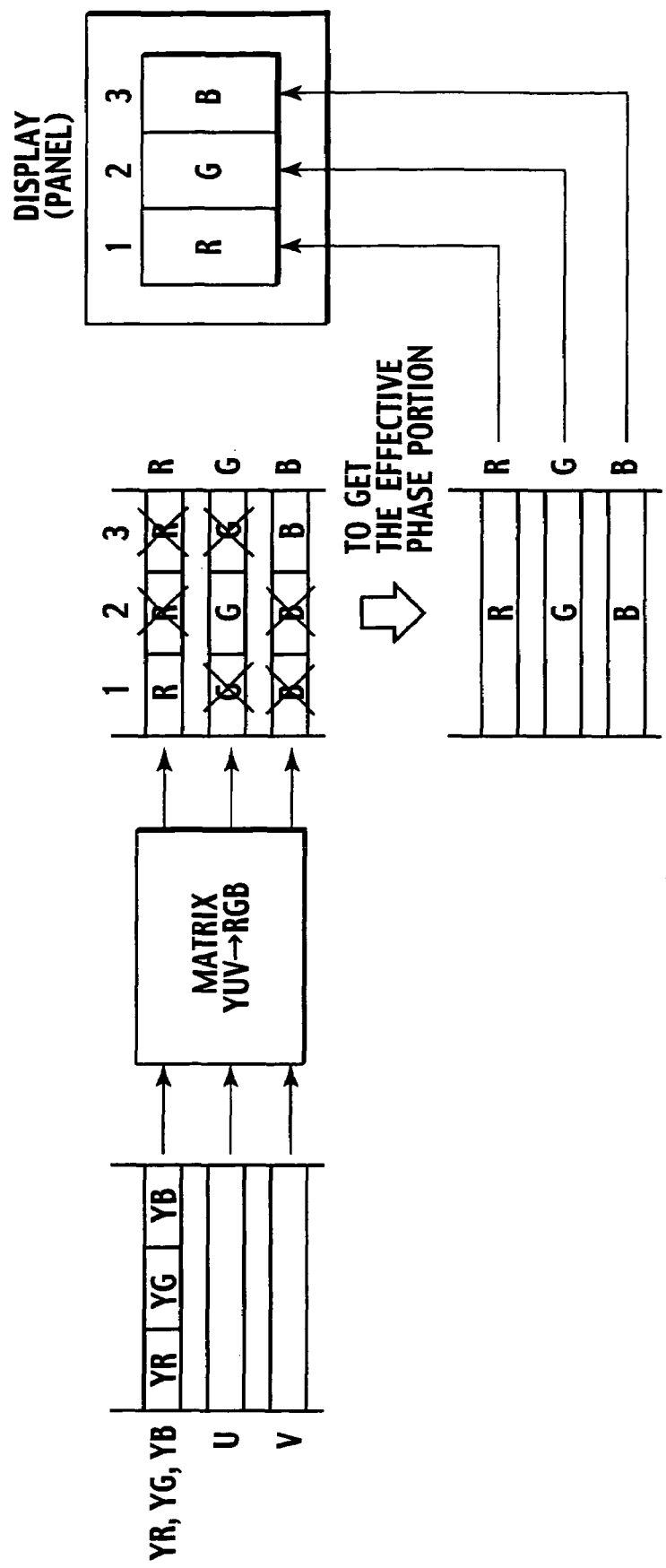
FIG. 8 is a view explaining a method of converting YUV signals containing luminance signals after the number-of-pixels conversion of subpixel into RGB signals.

As shown in FIG. 8, the luminance signals after the number-of-pixels conversion of subpixel are matrix-transformed (YUV→RGB) to produce RGB signals that contain high-frequency components of the luminance signals YR, YG, YB. Each signal of RGB has three phases per one pixel as indicated by "1", "2", "3" in FIG. 8. The phase that corresponds to the arrangement order of the RGB subpixels in one pixel in the display on a one-to-one basis, out of them serves as an effective phase, and the signal in the effective phase portion gives each subpixel data. In FIG. 8, "X" is put against the signals of the phases except the effective phase. Since the phase of the R signal on the display is "1" (the arrangement order of the R subpixel in one pixel of the display is "1"), the signal whose phase of the output obtained after the matrix transformation is "1" becomes effective. Similarly, since the phase of the G signal is "2", the signal whose phase of the output obtained after the matrix transformation is "2" becomes effective. Also, since the phase of the B signal is "3", the signal whose phase of the output obtained after the matrix transformation is "3" becomes effective.

Figure 9:
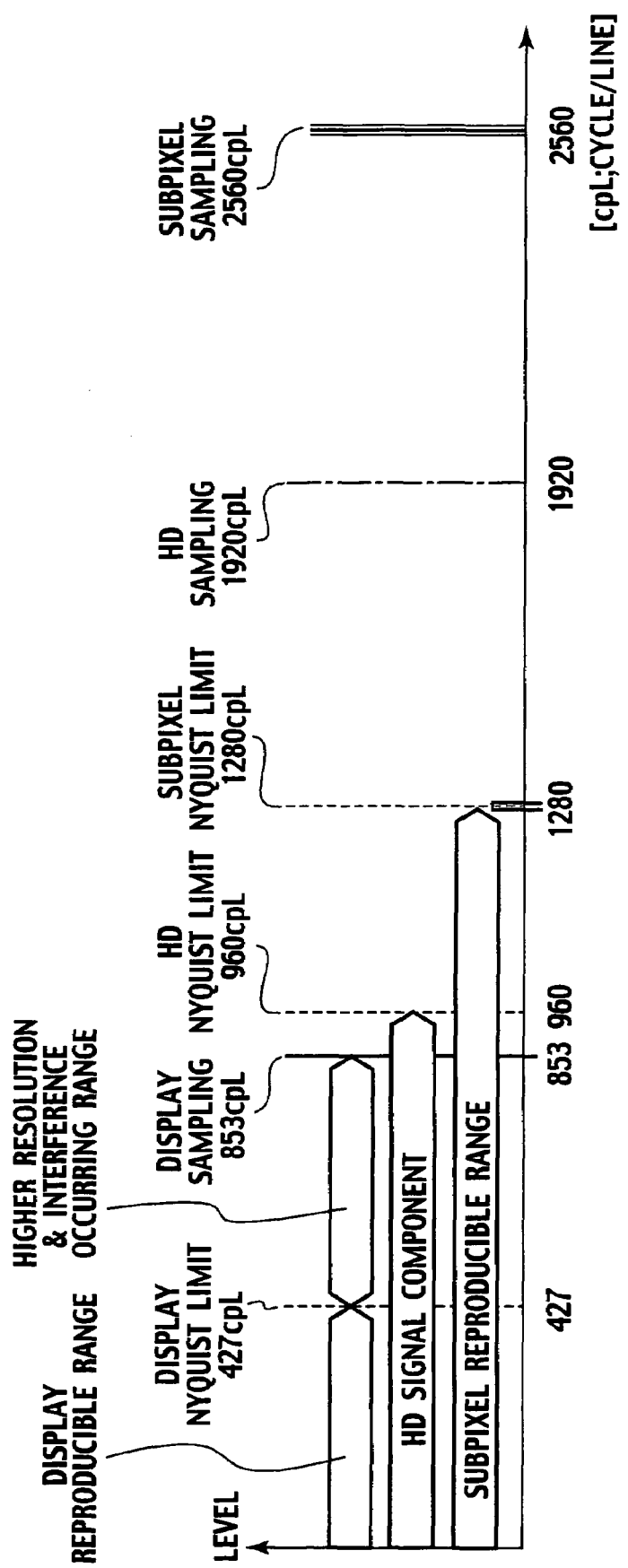
FIG. 9 is a view explaining spectrum components after the number-of-pixels conversion of subpixel.

FIG. 9 is a view explaining spectrum components after the number-of-pixels conversion of subpixel is applied. As shown in FIG. 9, the reproducible range of luminance signal based on the number-of-pixels conversion of subpixel is given as 1280 cpL that is the Nyquist limit of the sampling frequency (2560 cpL) of subpixel. Also, the Nyquist limit of the high-definition image signal is 960 cpL. The Nyquist limit based on the number of pixels (853 cpL) of the display, i.e., the reproducible range of display is given as 427 cpL. Where the bandwidth, which is higher than 427 cpL of the reproducible range of display but is lower than 960 cpL of the high-definition luminance signal, of the luminance signal after the number-of-pixels conversion of subpixel is defined as the bandwidth that can be broadened by reproducing the luminance signal by means of the subpixel. Therefore, if the Nyquist limit is improved by the number-of-pixels conversion of subpixel, the high-quality converted picture can be obtained while suppressing generation of the aliasing interference.

Meanwhile, there exists the problem that, since each subpixel has the color (R, G, B) peculiar to each subpixel in the high-frequency luminance component, sometimes the pseudo color interference occurs in compensation for the above expansion of the bandwidth. For this reason, a sampling rate converting system according to the first embodiment is constructed in such a manner that the sampling rate is converted by mixing the luminance signal that is subjected to the number-of-pixels conversion of subpixel and the luminance signal that is subjected normally to the number-of-pixels conversion in units of pixel.

Figure 2:
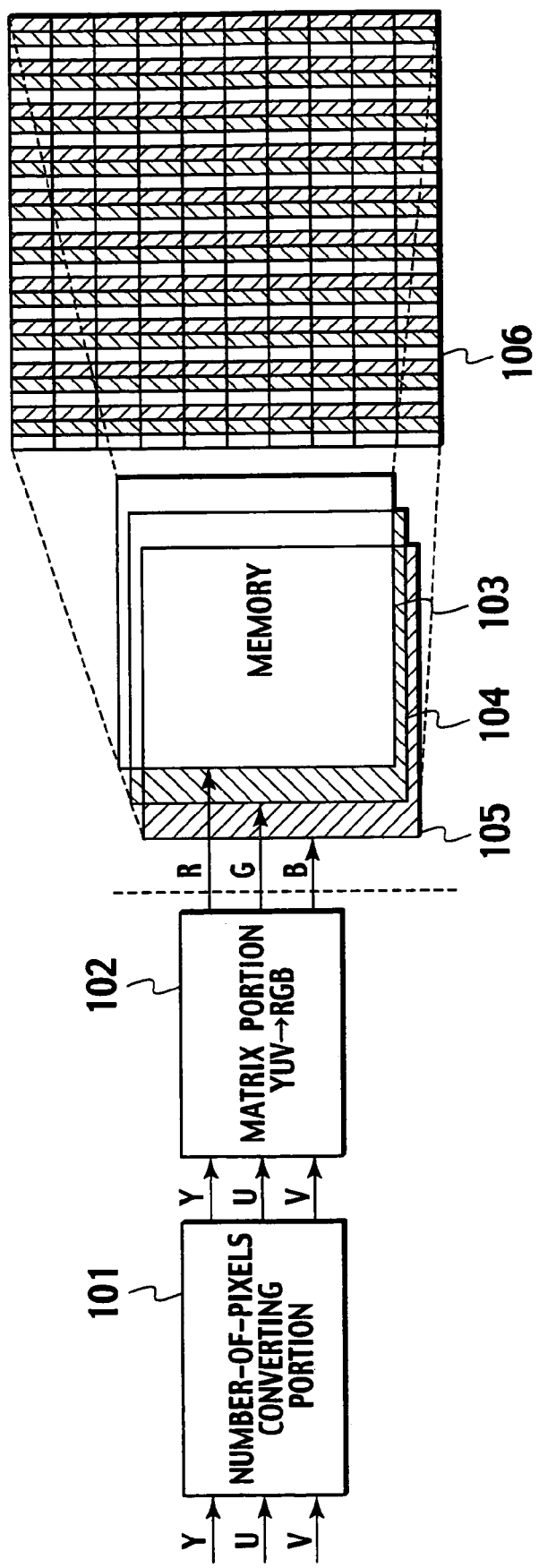
FIG. 2 is a view explaining image display in a display in a prior art.
Figure 10:
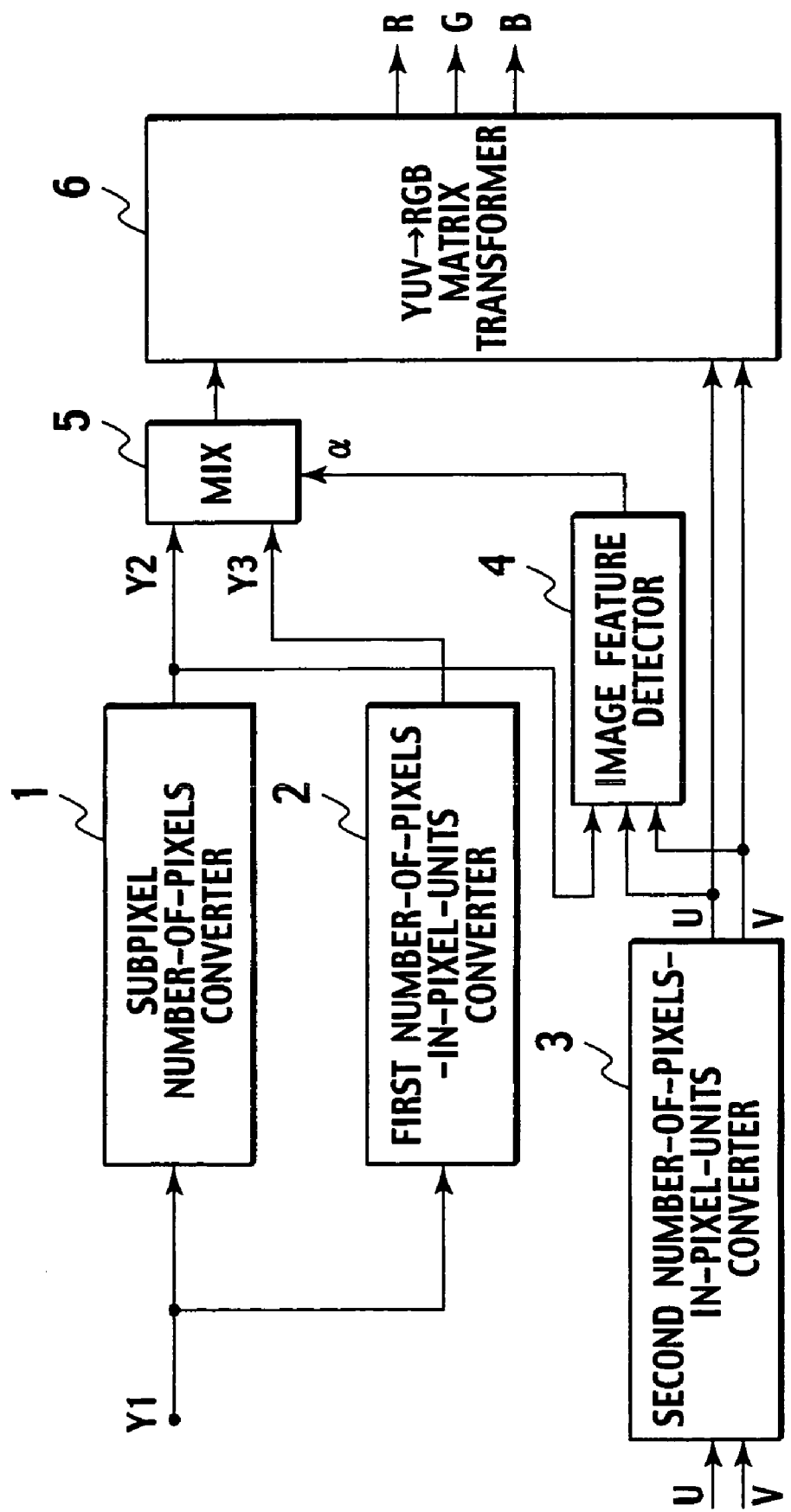
FIG. 10 is a block diagram showing a configuration of a sampling rate converting system according to a first embodiment of the present invention.

FIG. 10 is a block diagram showing a configuration of a subpixel sampling rate converting system according to the first embodiment of the present invention. This system includes a subpixel number-of-pixels converter 1, a first number-of-pixels-in-pixel-units converter 2, a second number-of-pixels-in-pixel-units converter 3, an image feature detector 4, a mixer (MIX) 5, and a [YUV→RGB] matrix transformer 6. Then, the RGB signals output from the YUV→RGB matrix transformer 6 are supplied to a display panel (not shown) (see FIG. 2).

The subpixel number-of-pixels converter 1 converts an input high-definition luminance signal (1920 cpL) Y1 into the luminance signal of 2560 cpL (subpixel sampling rate), which corresponds to the number of subpixels of the display in the horizontal direction and is shown in (D) of FIG. 7, by the above number-of-pixels conversion of subpixel and then outputs the resultant signal. The first number-of-pixels-in-pixel-units converter 2 converts the input high-definition luminance signal into the luminance signal of 853 cpL, which corresponds to the number of pixels of the display in the horizontal direction and is shown in (E) of FIG. 7, by the number-of-pixels conversion in the prior art and then outputs the resultant signal.

The second number-of-pixels-in-pixel-units converter 3 converts input high-definition color difference signals (960 cpL) into color difference signals of 853 cpL, which corresponds to the number of pixels of the display in the horizontal direction, by the number-of-pixels conversion and then outputs the resultant signal. The second number-of-pixels-in-pixel-units converter 3 may be constructed similarly to the first number-of-pixels-in-pixel-units converter 2, or may be simplified based on the bandwidth of the color difference signals.

The image feature detector 4 senses particular waveform patterns that are mixed into the high-frequency range of an output luminance signal Y2 from the subpixel number-of-pixels converter 1, e.g., locations at which the pseudo color interference occurs, based on the high-definition luminance signal and the output color difference signals from the second number-of-pixels-in-pixel-units converter 3 and then outputs a control value α to the mixer 5 based on the sensed result.

The image feature detector 4 must output an effective adaptive signal, i.e., a control value α on the basis of the visual nature of human beings. Owing to the visual nature of human beings, a pseudo color interference that occurred in an essentially achromatic area on a bright screen whose luminance level is high is prone to catch the eye. In contrast, the visual nature of human beings has such a feature that a pseudo color interference that occurred in a dark color area is not conspicuous because such interference is masked with surrounding colors. In the present embodiment, a pseudo color interference occurs locally in a high-frequency range to have a small area.

The mixer 5 mixes the output luminance signal Y2 from the subpixel number-of-pixels converter 1 and an output luminance signal Y3 from the first number-of-pixels-in-pixel-units converter 2 at a mixing rate in accordance with the control value α, and then outputs the mixed luminance signal. More particularly, the mixer 5 executes the mixture according to the control value α such that the output luminance signal Y3 from the first number-of-pixels-in-pixel-units converter 2 has preference in a location where the pseudo color interference occurs. The control value α is set to a value ranging from 0 to 1. The luminance signal Y2 is output as it is when α=0, the luminance signal Y3 is output as it is when α=0, and the luminance signals Y2 and Y3 are mixed at a rate in accordance with the control value when α is larger than 0 but smaller than 1.

The [YUV→RGB] matrix transformer 6 matrix-transforms an output luminance signal from the mixer 5 and output color-difference signals from the second number-of-pixels-in-pixel-units converter 3 into RGB signals that contain the high-frequency component of the high-definition signal. The RGB signals that were subjected to the matrix transformation are output to a display.

Figure 11:
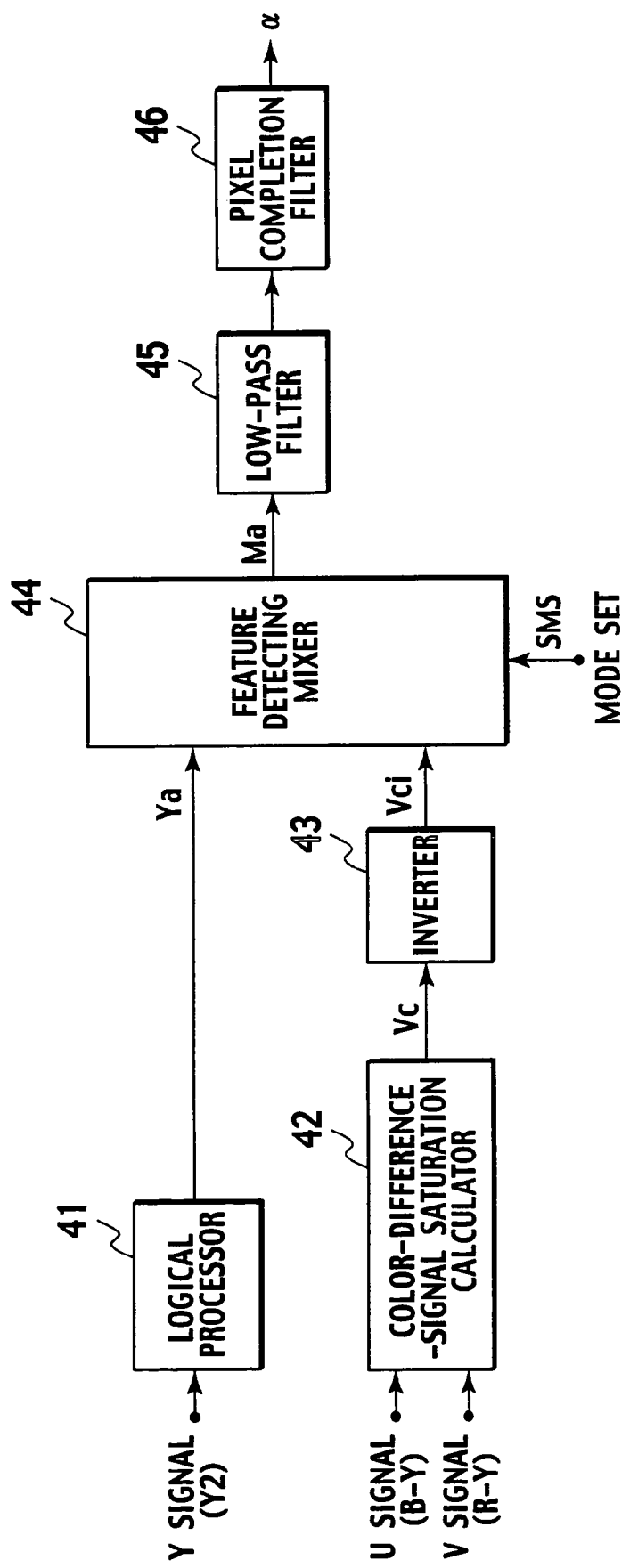
FIG. 11 is a block diagram showing a configuration of an image feature detector shown in FIG. 10.

FIG. 11 is a block diagram showing a configuration of the image feature detector 4. The image feature detector 4 includes a logical processor 41, a color-difference-signal saturation calculator 42, an inverter 43, a feature detecting mixer 44, a low-pass filter 45, and a pixel completion filter 46.

The logical processor 41 selects the minimum value among three points in the horizontal direction as the subpixel arrangement direction and outputs the value. Suppose that an output signal is Ya and an input signal is Yi, the output signal Ya is given by $Ya=\min(Yi(n-1), Yi(n), Yi(n+1))$ According to this process, the black side of the signal waveform is extended. This extends the bandwidth of the edge portion as a high-frequency component of the Y signal. The extension of the bandwidth of the edge portion leads to a positive extension of the bandwidth of the black or dark portion, in which the pseudo color interference is inconspicuous, while holding an adaptive signal level (control value α) in the edge portion at a low level.

In this case, an operation in the logical processor 41 is not limited to this. The minimum value among the signal values at four points or more in the horizontal direction may be selected.

Figure 12A:
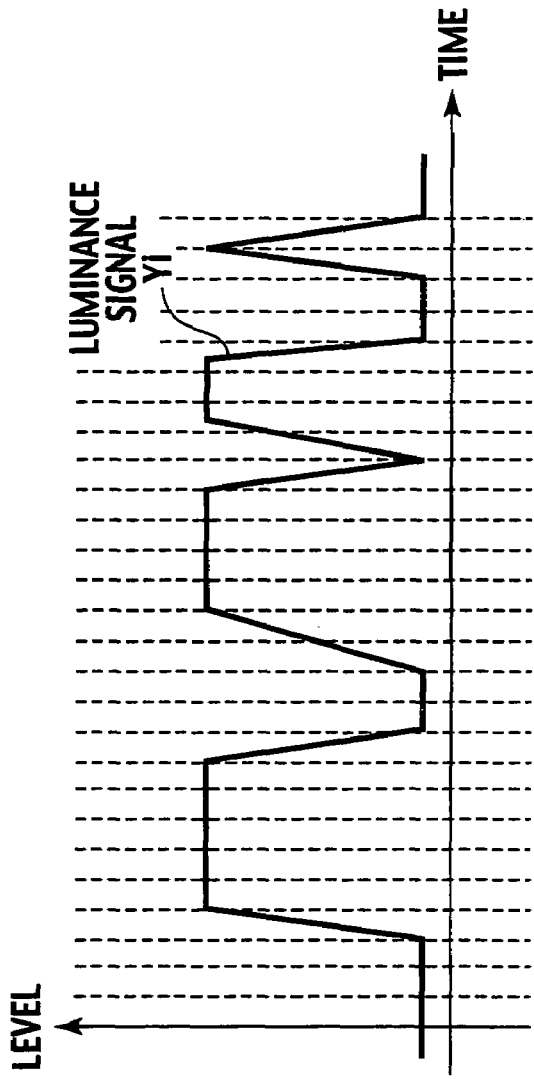
FIGS. 12A and 12B are waveform diagrams explaining processes in a logical process shown in FIG. 11.
Figure 12B:
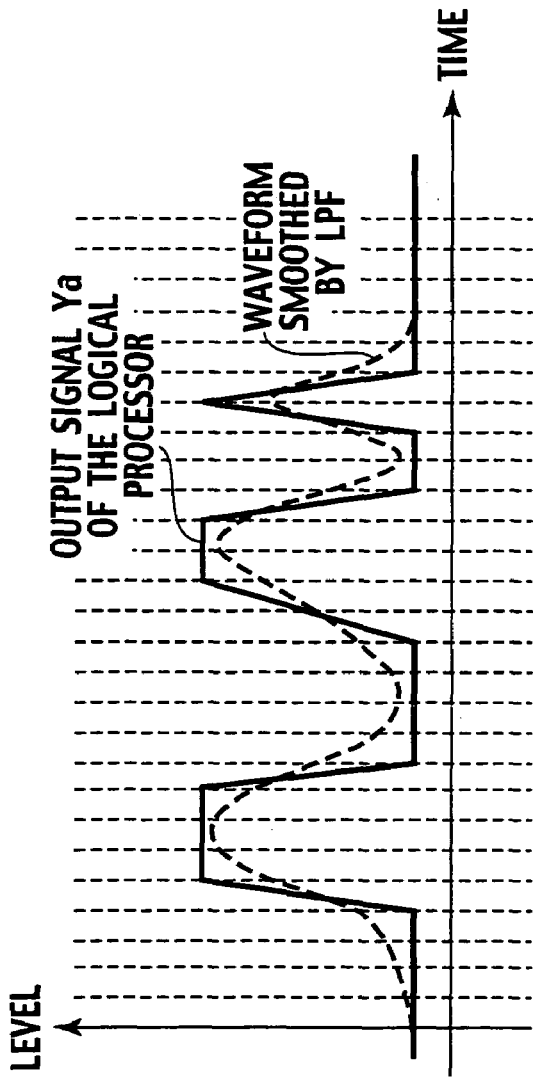

FIGS. 12A and 12B illustrate a Y signal waveform as a model respectively to explain an operation of the logical processor 41. FIG. 12A shows an input Y signal waveform, and a solid line in FIG. 12B indicates an output signal Ya of the logical processor 41. It is possible to confirm that the black side of the output signal Ya is extended in contrast to the input signal Yi. Vertical broken lines in FIGS. 12A and 12B represent the sampling points in the subpixel sampling rate.

The color-difference-signal saturation calculator 42 derives a degree of saturation from the UV signal of the color difference signals and then outputs the degree of saturation. Since a degree of saturation is a scalar quantity Vc of vectors corresponding to the color difference signals that intersect orthogonally, such degree of saturation can be given by $$Vc=\mathrm{sqrt}(V*V+U*U)$$

where sqrt( ) is a square root calculation.

The inverter 43 inverts the degree of saturation Vc of the color signal within a dynamic range of the digital signal. In the case of 8-bit data, zero indicates the smallest degree of saturation (depth of color) and the maximum value 255 indicates the darkest color. The inverter 43 inverts this situation. This is because the adaptive signal level (control value α) should be set such that the bandwidth is extended when the color is dark, i.e., the degree of saturation Vc is large whereas the interference is suppressed when the color is light, i.e., the degree of saturation Vc is small.

The feature detecting mixer 44 mixes logically a signal Ya derived from the input luminance signal Yi and the scalar quantity Vc of the color difference vectors based on a following expression, and generates a signal Ma.

$$Ma=\min(kc*Vc, ky*Ya)$$

where kc, ky are a scaling factor respectively.

Various calculating processes such as a maximum value, a mean value, a difference value, output of only one input, output of a fixed value, and the like may be considered as the logical synthesizing method herein, in addition to the minimization made by the above expression, and may be selected in accordance with a mode setting signal SMS that is input into the feature detecting mixer 44 depending upon contents of the image. That is, the mode setting signal SMS is selected dependent upon the contents of the image, more particularly one of the images having different properties such as the natural image, the graphics image, the text, and the like. The selection of the minimum value shows such an example that the most effective result of the feature extraction can be derived from the natural image. In case the minimum value is selected, the signal system side to suppress the interference is selected in the light-in-color area on the bright screen whereas the broadband signal system side is selected in the deep-in-color area on the dark screen. The "selection" mentioned herein corresponds to an available value of the control value α. Then, the signal system to suppress the interference is selected if the control value α takes a large value (value close to a control factor 1), while the broadband signal system is selected if the control value α takes a small value (value close to a control factor 0).

The low-pass filter 45 smoothes the output of the feature detecting mixer 44. The low-pass filter 45 is inserted to avoid a discontinuity caused by a sharp change. A waveform indicated by a broken line in FIG. 12B gives an output signal waveform of the low-pass filter 45. Her, this view gives an image view in which the case where no color component is present is assumed.

FIGS. 13A to 13C are views showing signal waveforms of respective portions, wherein FIG. 13A shows the waveform of the signal Ya input from the logical processor 41, FIG. 13B shows the waveform of the signal Vci which is input from the inverter 43 and in which the degree of saturation Vc is inverted, and FIG. 13C shows a waveform (solid line) obtained by selecting the minimum value signal by the feature detecting mixer 44, to overlap it with the waveforms (a dot-dashed line and a chain double-dashed line) illustrated in FIGS. 13A and 13B.

Figure 14:
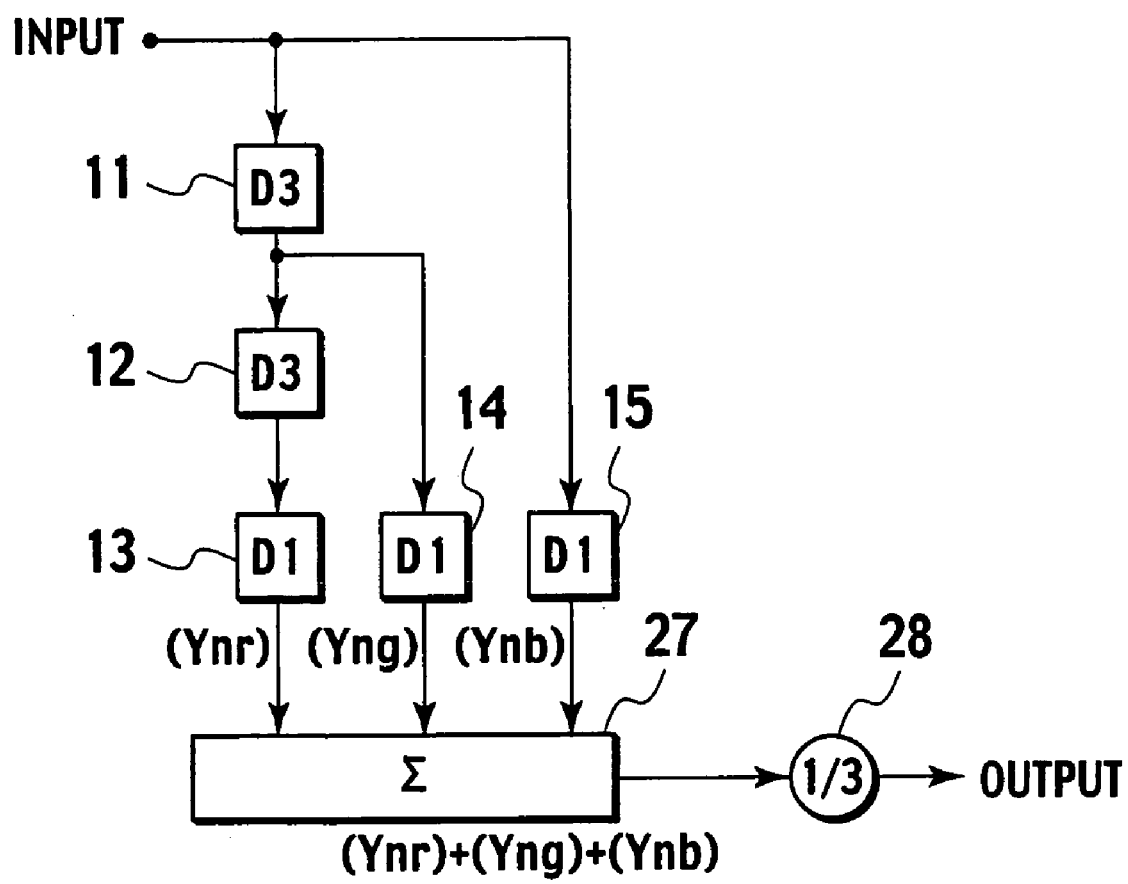
FIG. 14 is a block diagram showing a configuration of a pixel completion filter shown in FIG. 11.

The pixel completion filter 46 applies a smoothing process to the output signal of the low-pass filter 45 over three RGB subpixels in one pixel. FIG. 14 is a block diagram showing a configuration of the pixel completion filter 46.

The pixel completion filter 46 includes first delay units 11, 12 for delaying an input signal by a delay time D3, second delay units 13, 14, 15 for delaying an input signal by a delay time D1, a summation unit 27, and a multiplier 28.

The edge trigger type flip flop, e.g., D-FF (flip flop), is expected as the first and second delay units. The first and second delay units hold input data at an output while using a clock pulse as a trigger and then output the data.

The first delay units 11, 12 delay the input luminance signal by the delay time D3, which corresponds to a rate of subpixels, i.e., about three times of the number of pixels (853 cpL) of the display herein or one cycle of 2560 cpL, respectively. The second delay units 13, 14, 15 delay the input luminance signal by the delay time D1, which corresponds to a number-of-pixel rate of the display, i.e., one cycle of 853 cpL herein, respectively. The summation unit 27 calculates a total sum of the luminance signals output from the second delay units 13, 14, 15. The multiplier 28 multiplies the calculated total sum by ⅓ and then outputs the calculated result.

Figure 15:
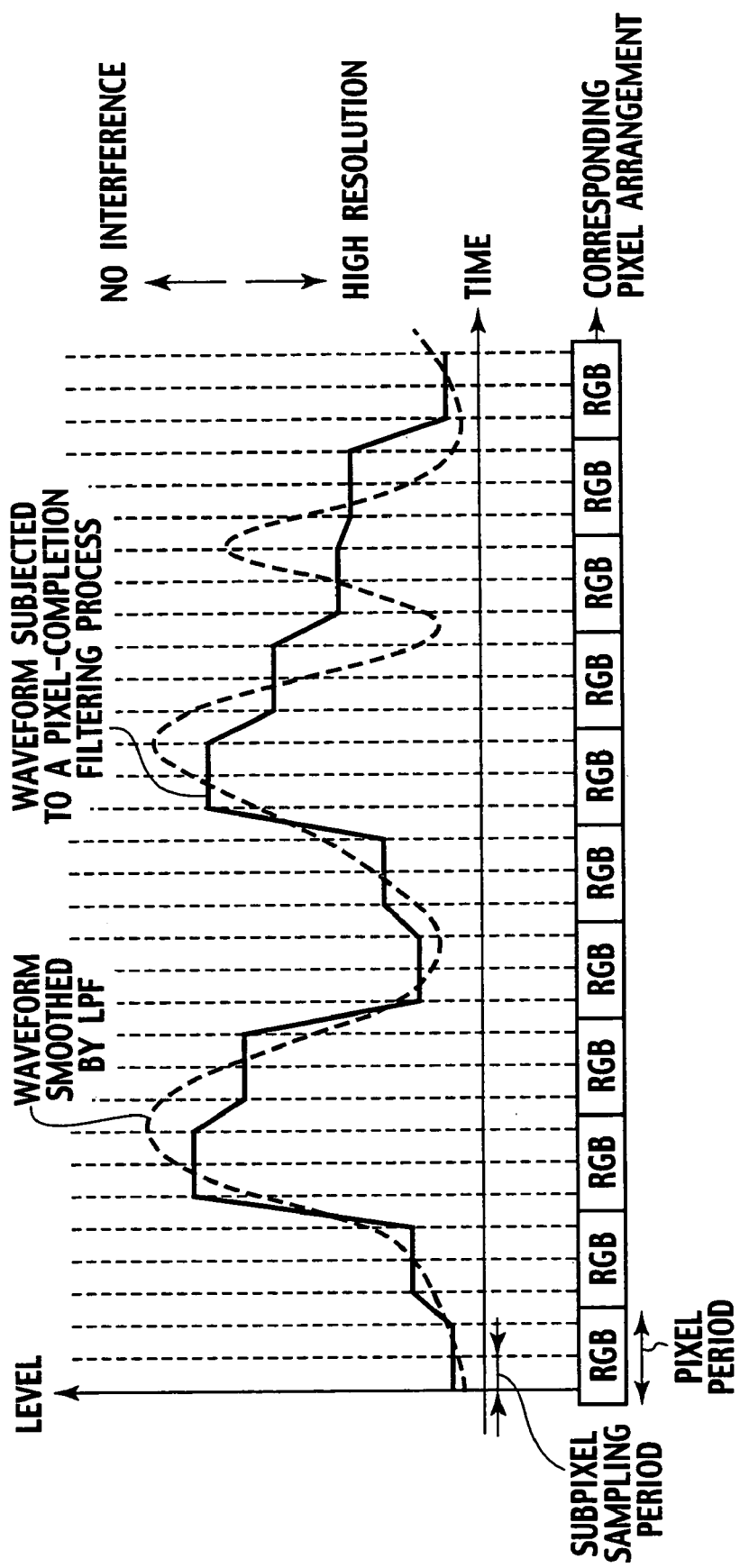
FIG. 15 is a waveform diagram explaining processes in the pixel completion filter.

FIG. 15 illustrates models of the waveforms of the output signal of the low-pass filter 45 and the output signal of the pixel completion filter 46. The low-pass filter 46 winds its output (broken line) between RGB to upset the RGB balance. Therefore, in case this output is used as the adaptive signal, the pseudo color interference is added inevitably. For this reason, it is the pixel completion filter 46 that averages the RGB signals within each pixel. The signal that is averaged every pixel of RGB and indicated by a solid line in FIG. 15 is the output of the pixel completion filter 46. This output signal is the adaptive signal, and controls a mixing rate of the mixer 5 shown in FIG. 10 as the control value α.

In this manner, the image feature detector 4 derives the control value α to suit the visual effect of human beings. In the present embodiment, the process not to cause the interference is selected in the bright and light-in-color portion whereas the broadband process is selected in the dark or deep-in-color portion, so that the process of extending positively the bandwidth of the edge portion having the wideband signal by using the subpixel sampling rate can be employed. Also, according to the mode setting signal SMS input into the feature detecting mixer 44, the control value α can be fixed to the intermediate control value or either of the above processes can be fixedly selected. This approach is effective in the case where the user wishes to check the contents of the image at a high resolution although the interference is caused. Conversely the user wishes sometimes to watch the unique image generated by the computer graphics while suppressing the generation of the pseudo color interference. The image feature detector 4 has the merit that it can utilize them selectively.

Figure 16:
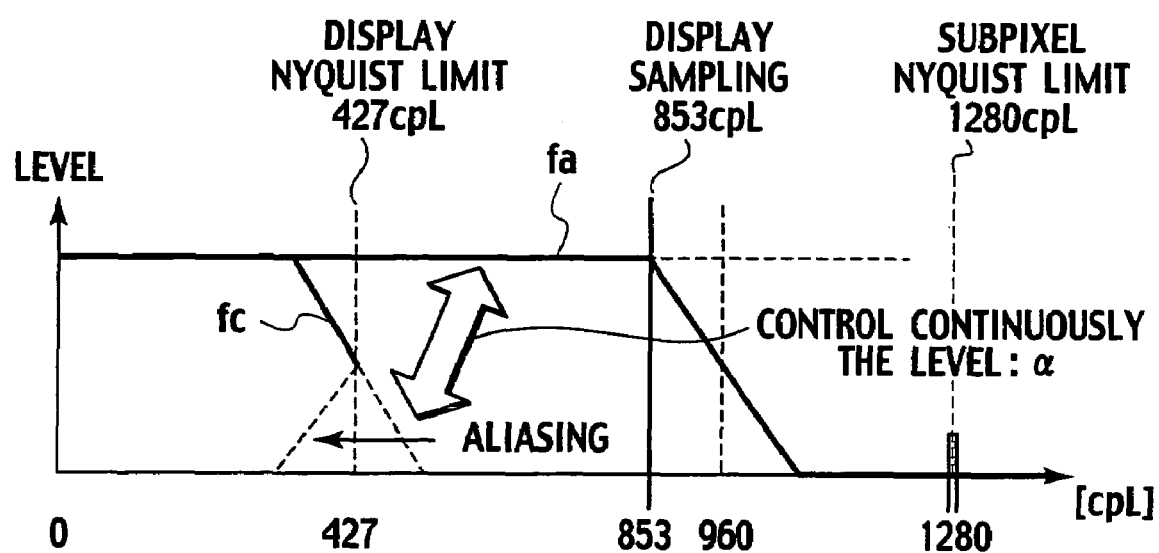
FIG. 16 is a view explaining a frequency characteristic of an output luminance signal in the system shown in FIG. 10.

FIG. 16 is a view explaining a frequency characteristic of the output luminance signal from the mixer 5. A characteristic indicated by fa is a frequency characteristic of the output luminance signal Y2 of the subpixel number-of-pixels converter 1 and can be extended up to 1280 cpL in principle. But such characteristic is set to a frequency characteristic that is suppressed substantially within the number of pixels of the display herein. In contrast, a characteristic indicated by fc is a frequency characteristic of the output luminance signal Y3 of the first number-of-pixels-in-pixel-units converter 2. Such characteristic is set to a frequency characteristic whose bandwidth is suppressed by setting a cut-off characteristic near the Nyquist limit of the display to reduce an influence of an aliasing below an allowable level.

These frequency characteristics fa, fc are decided by a filtering process applied in converting the number of pixels. But these characteristics may be realized as a characteristic that is convoluted on a time base by the filtering process applied in converting the number of pixels and another filtering process different from the filtering process.

A mixing rate of the output luminance signal Y2 of the subpixel number-of-pixels converter 1 and the output luminance signal Y3 of the first number-of-pixels-in-pixel-units converter 2 is controlled by the mixer 5, based on the control value α output from the image feature detector 4. Therefore, a frequency characteristic of the output signal of the mixer 5 is obtained as a characteristic between the characteristic fc and the characteristic fa (a characteristic in a range whose lower limit is the characteristic fc and whose upper limit is the characteristic fa). As a result, when the particular waveform pattern from which the pseudo color interference is ready to occur is sensed, the frequency characteristic of the output signal comes close to the characteristic fc by bringing the control value α close to "1", and thus the pseudo color interference can be suppressed adaptively.

Second Embodiment

Figure 17:
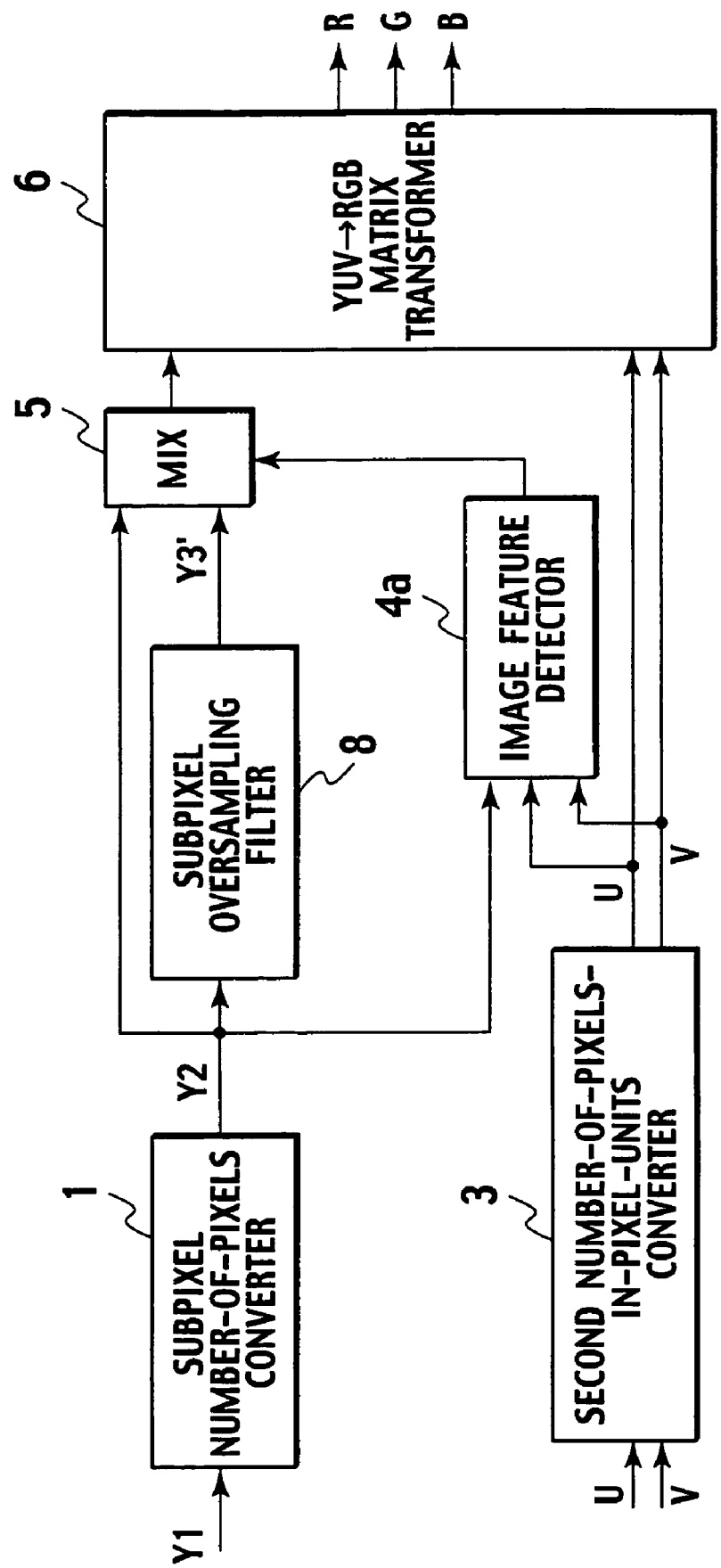
FIG. 17 is a block diagram showing a configuration of a sampling rate converting system according to a second embodiment of the present invention.

FIG. 17 is a block diagram showing a configuration of a sampling rate converting system according to the second embodiment of the present invention. Here the same reference symbols are affixed to the same constituent element as those in the system according to the first embodiment.

The sampling rate converting system according to the second embodiment includes the subpixel number-of-pixels converter 1, a subpixel oversampling filter 8, the second number-of-pixels-in-pixel-units converter 3, an image feature detector 4a, the mixer (MIX) 5, and the [YUV→RGB] matrix transformer 6.

The subpixel number-of-pixels converter 1 outputs the luminance signal Y2 of 2560 cpL shown in FIG. 6 and (D) of FIG. 7 by the number-of-pixels conversion of subpixel, and the second number-of-pixels-in-pixel-units converter 3 outputs the color difference signals U, V of 853 cpL. Here, as shown in FIG. 6, the output luminance signal Y2 of the subpixel number-of-pixels converter 1 and the output color difference signals U, V of the second number-of-pixels-in-pixel-units converter 3 are synchronized mutually in a three-to-one relationship.

Figure 18:
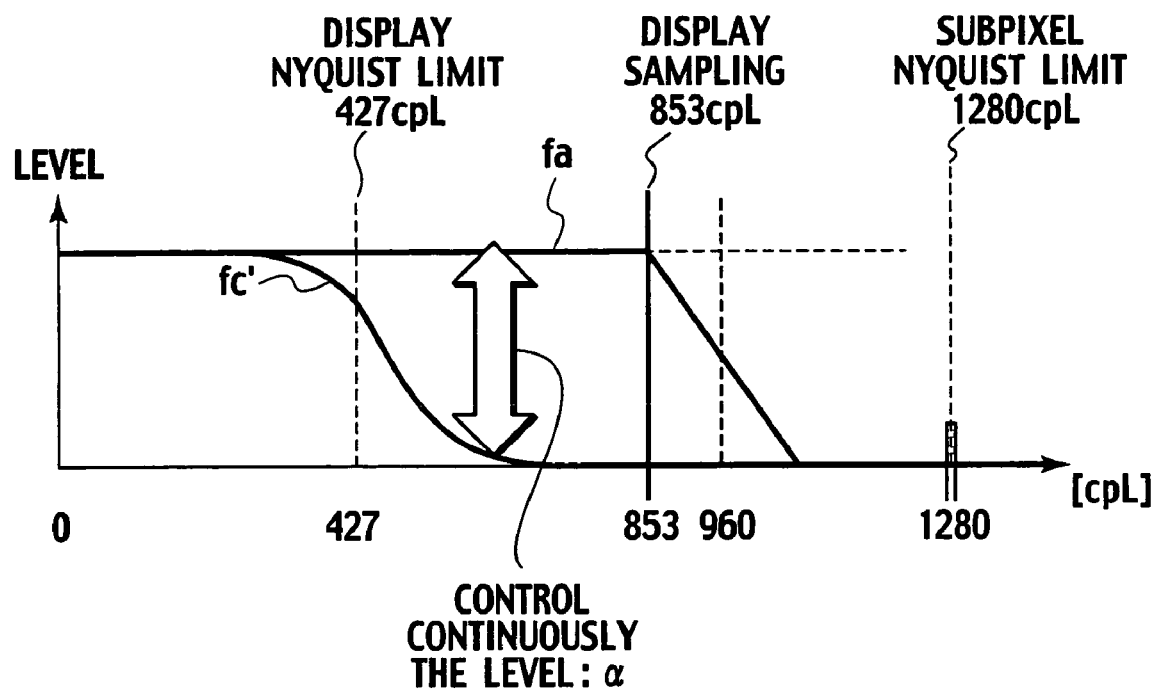
FIG. 18 is a view explaining a frequency characteristic of an output luminance signal in the system shown in FIG. 17.

The subpixel oversampling filter 8 is a filter (e.g., digital filter such as an FIR (Finite Impulse Response) filter, or the like) that suppresses the bandwidth of the output luminance signal Y2, which is broadened by the number-of-pixels conversion of subpixel, within a bandwidth from which any pseudo color interference is not generated. A characteristic fc' shown in FIG. 18 gives a frequency characteristic of the output luminance signal of the subpixel oversampling filter 8, and the bandwidth of the frequency characteristic is suppressed up to near the Nyquist limit 427 cpL of the display. The subpixel oversampling filter 8 outputs a luminance signal Y3' whose bandwidth is limited.

The image feature detector 4a is constructed similarly to the above image feature detector 4, and outputs the control value α similarly to the image feature detector 4 based on the output luminance signal Y2 after the number-of-pixels conversion of subpixel and the output color difference signals U, V from the second number-of-pixels-in-pixel-units converter 3. The mixer 5 mixes the output luminance signal Y2 of the subpixel number-of-pixels converter 1 and the output luminance signal Y3' of the subpixel oversampling filter 8, and changes its mixing rate according to the control value α.

Therefore, the frequency characteristic of the output luminance signal of the mixer 5 is controlled between the characteristic fc' and the characteristic fa shown in FIG. 18 by the control value α.

The [YUV→RGB] matrix transformer 6 matrix-transforms the output luminance signal of the mixer 5 and the output color-difference signals U, V of the second number-of-pixels-in-pixel-units converter 3 into the RGB signals, and then outputs the RGB signals to the display.

According to the sampling rate converting system shown in FIG. 17, the broadened luminance signal Y2 and the luminance signal Y3' whose bandwidth is limited by the subpixel oversampling filter 8 not to cause a pseudo color interference are mixed, and also the mixing rate is controlled variably according to the control value α. As a result, the high-quality (high-definition) converted picture quality can be obtained while suppressing adaptively the pseudo color interference.

Third Embodiment

Figure 19:
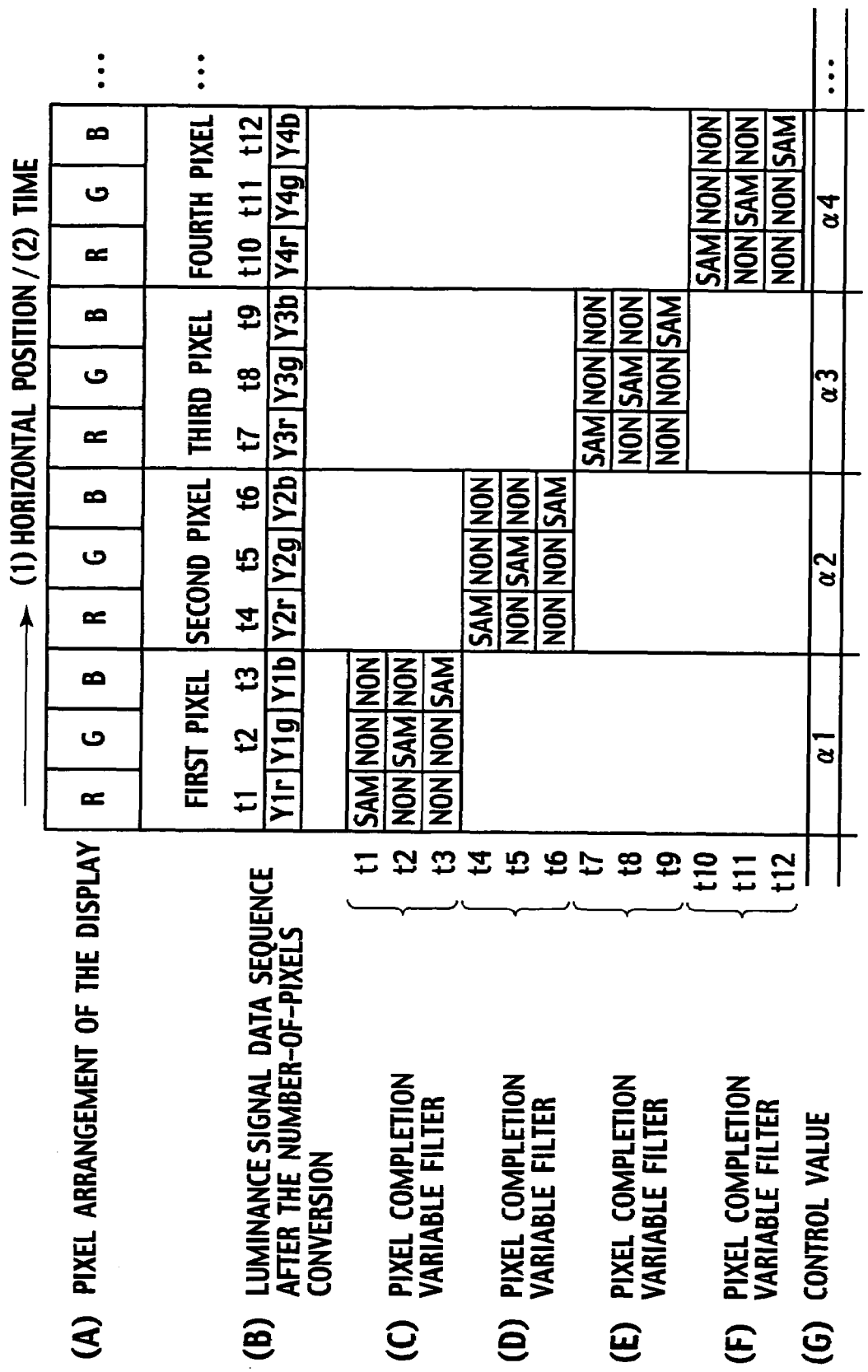
FIG. 19 is a view explaining the concept of a filtering process, which is applied to a sampling rate converting system according to a third embodiment of the present invention, in time series.

FIG. 19 is a view explaining a pixel completion variable filtering process that is applied to a sampling rate converting system according to the third embodiment of the present invention. In FIG. 19, the lateral direction corresponds to the horizontal direction on a display, i.e., a time base.

First, (A) of FIG. 19 shows the pixel arrangement of the display in the horizontal direction, and (B) of FIG. 19 shows a luminance signal after the number-of-pixels conversion of subpixel, i.e., a data sequence of the luminance signal of 2560 cpL shown in (D) of FIG. 7. In this data sequence, the luminance signal is varied in time series (t1 to t12). Then, (C) to (F) of FIG. 19 show the pixel completion variable filter, which is varied in time series (t1 to t12), respectively. A "sam" in (C) to (F) of FIG. 19 denotes an output sampling point and represents a phase of a luminance signal that is subjected to the number-of-pixels conversion of subpixel and that corresponds to each subpixel of RGB of the display. The output sampling points are shifted with the lapse of time (t1, t2, t3, . . . ) in order of the RGB subpixel arrangement of the pixels, as shown in (C) to (F) of FIG. 19. Also, a "non" denotes an output non-sampling point and represents a phase of a luminance signal that is synthesized with (added to) the luminance signal of the output sampling point by multiplying a filtering factor.

Now, the filtering factor of the output sampling point and output non-sampling point are given by

| output sampling point | (1/3) + (2/3) × (1 − α) |
|---|---|
| output non-sampling point | (1/3) × α | respectively. The control value α is the output of the image feature detector 4a (identical to that shown in FIG. 17) shown in FIG. 23 described later, and ranges from 0 to 1. When the control value α is "0", the filtering factor of the output sampling point becomes "1" and thus only luminance signals corresponding to the output sampling points are output. When the control value α is "1", a sum of one output sampling point and two output non-sampling points becomes 1, and respective filtering factors of the luminance signal corresponding to three subpixels are (⅓, ⅓, ⅓). Thus, the average luminance signal among subpixels in one pixel is output.

Here, the control value $\alpha$ has a value in a range of 0 to 1. If the control value $\alpha$ is held at the same value in one pixel, the control value $\alpha$ is changed in units of pixel and thus the filtering factor value is changed in units of pixel.

Also, the control value $\alpha$ having the same value is never changed in each pixel, and never extends over plural pixels. In other words, since the filtering process does not extend over plural pixels and is completed within three subpixels in each pixel, such filtering process executed based on the same control value $\alpha$ is completed within each pixel. For this reason, the filter shown in (C) to (F) of FIG. 19 is called the "pixel completion variable filter". Here, as shown in (G) of FIG. 19, since the control value $\alpha$ is changed in units of pixel, the characteristic of the filtering process is also changed in units of pixel. In FIG. 19, the pixel completion variable filters shown in (C) to (F) of FIG. 19 correspond to the first to fourth pixels respectively.

In this event, in the example shown in FIG. 19, it is assumed that the control value $\alpha$ is changed in units of pixel. Even if the control value $\alpha$ is changed in a pixel, the luminance signals between the pixels are never intermixed together and thus the control value may be changed in units of subpixel rate.

In the pixel completion variable filter shown in FIG. 19, when the control value $\alpha$ is "0", the luminance signal itself which is subjected to the number-of-pixels conversion of subpixel is output. Therefore, when the output luminance signal is matrix-transformed, the balance of the matrix coefficients is upset and thus a pseudo color interference is caused. In contrast, when the control value $\alpha$ is "1", the filtering factors of the luminance signals corresponding to respective subpixels are averaged to ⅓. Thus, the balance of the matrix coefficients is never upset and thus the balance can be maintained among respective subpixels of RGB. As a result, when the control value $\alpha$ is "1", any pseudo color interference is not caused.

Figure 20:
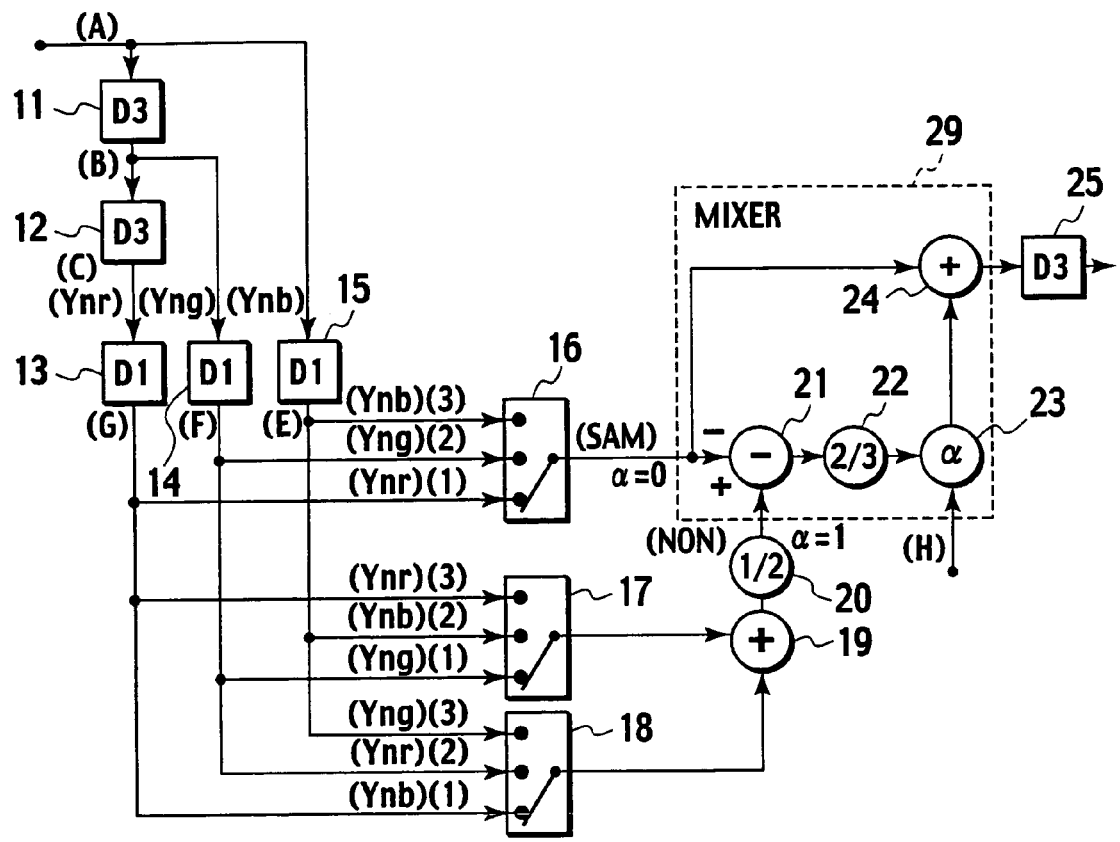
FIG. 20 is a functional block diagram explaining a filtering process executed by the pixel completion variable filter.
Figure 30:
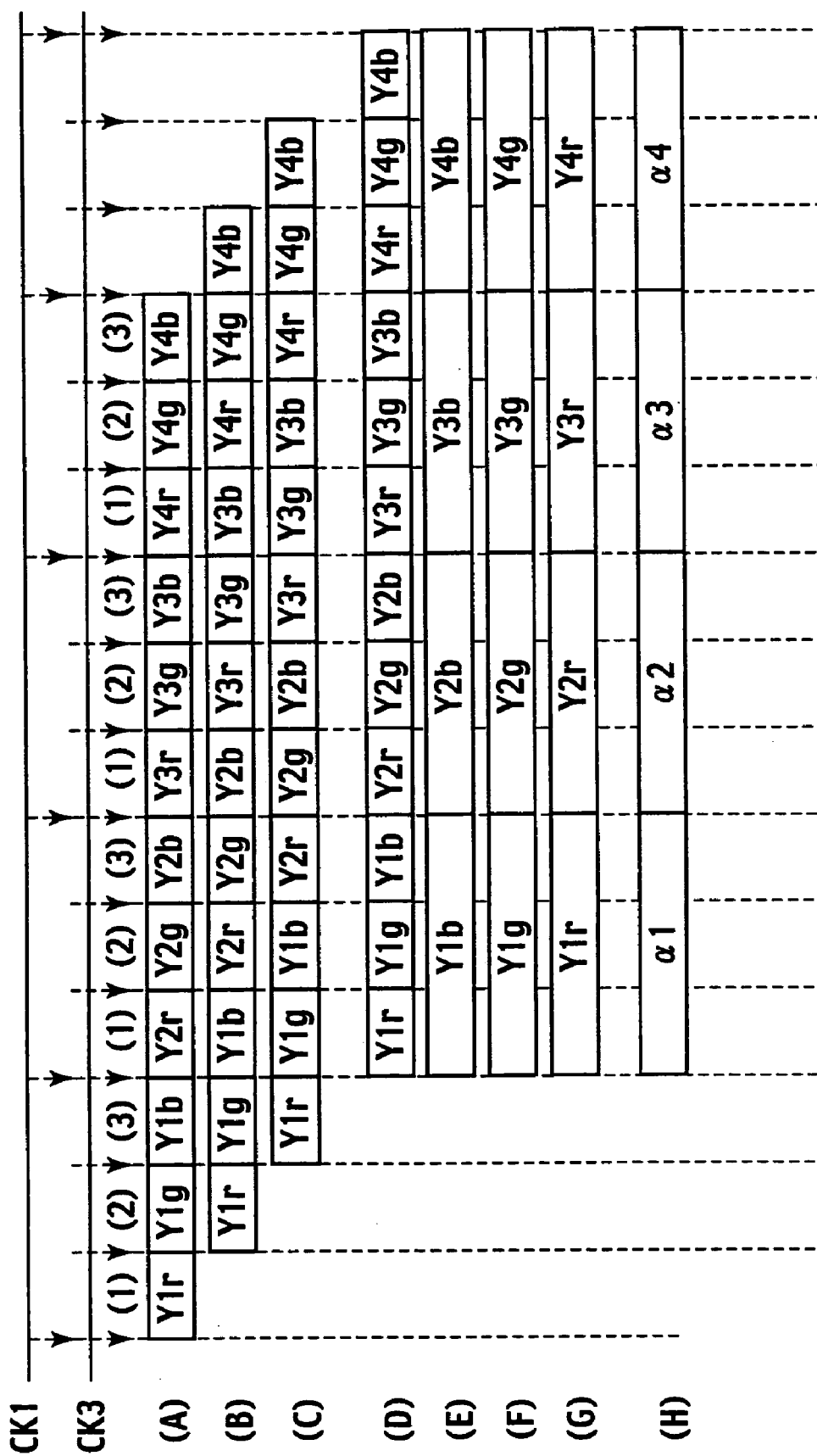
FIG. 30 is a view showing signal data in respective portions in FIG. 20, FIG. 21, or FIG. 27 on a time-series basis.

FIG. 20 is a functional block diagram explaining the filtering process executed by the pixel completion variable filter in FIG. 19. Also, FIG. 30 is a view showing signal data in respective portions in FIG. 20 on a time-series basis. (A) to (H) of FIG. 30 correspond to the signal data sequence in portions indicated by affixing (A) to (H) to FIG. 20 respectively.

A filtering process module shown in FIG. 20 includes the first delay units 11, 12, 25 for delaying an input signal by the delay time D3, the second delay units 13, 14, 15 for delaying an input signal by the delay time D1, selectors 16, 17, 18, adders 19, 24, multipliers 20, 22, 23, and a subtracter 21. A mixer 29 consists of the subtracter 21, the multipliers 22, 23, and the adder 24.

The edge trigger type flip flop, e.g., D-FF (flip flop), is expected as each of the first and second delay units. The first and second delay units hold an input data at an output while using a clock pulse as a trigger and then output the data.

The first delay units 11, 12, 25 delay an input luminance signal by the delay time D3, which corresponds to a rate of subpixels, i.e., about three times of the number of pixels (853 cpL) of the display herein or one cycle of 2560 cpL, respectively. This delay is shown as a delay of a period CK3 in FIG. 30. The second delay units 13, 14, 15 delay an input luminance signal by the delay time D1, which corresponds to the number-of-pixel rate of the display, i.e., one cycle of 853 cpL herein, respectively. This delay is shown as a delay of a period CK1 in FIG. 30.

The luminance signals from the second delay units 13, 14, 15 are input into input terminals (1) to (3) of each of the selectors 16, 17, 18. The luminance signals input from the second delay units 13, 14, 15 are shown in (E) to (G) of FIG. 30. Also, the selectors 16, 17, 18 switch connections of the corresponding input terminals (1) to (3) to the output terminal in synchronism with the timings (1) to (3) shown in FIG. 30. Here the selector 16 outputs the luminance signal corresponding to the output sampling point, while the selectors 17, 18 output the luminance signals corresponding to the output non-sampling points.

The adder 19 adds the output luminance signals output from the selectors 17 and 18, and the multiplier 20 multiplies the luminance signal output from the adder 19 by ½. The subtracter 21 subtracts the output luminance signal of the selector 16, which is input from the system $\alpha=0$ of the mixer 29, from the output luminance signal of the multiplier 20, which is input from the system $\alpha=1$ of the mixer 29. The multiplier 22 multiplies the luminance signal output from the subtracter 21 by ⅔, and the multiplier 23 multiplies the luminance signal output from the multiplier 22 by the control value $\alpha$. The control value $\alpha$ is supplied from the image feature detector 4a to the multiplier 23. The adder 24 adds the luminance signal that is multiplied by the control value $\alpha$ and the output luminance signal of the selector 16. The first delay unit 25 delays the luminance signal output from the adder 24 by the delay time D3 and then outputs the delayed signal.

The mixer 29 consisting of the subtracter 21, the multiplier 22, multiplier 23, and the adder 24 provides the filtering factors for the output sampling points and the output non-sampling points shown in (C) to (F) of FIG. 19. The mixer 29 mixes the luminance signal corresponding to the output sampling points and the luminance signal corresponding to the output non-sampling points according to the control value $\alpha$.

In this case, the filtering process module for realizing the filtering process by the pixel completion variable filter in FIG. 19 is not limited to the module having the selector shown in FIG. 20. For example, the module having the summation unit 27 shown in FIG. 21 may be employed.

Figure 21:
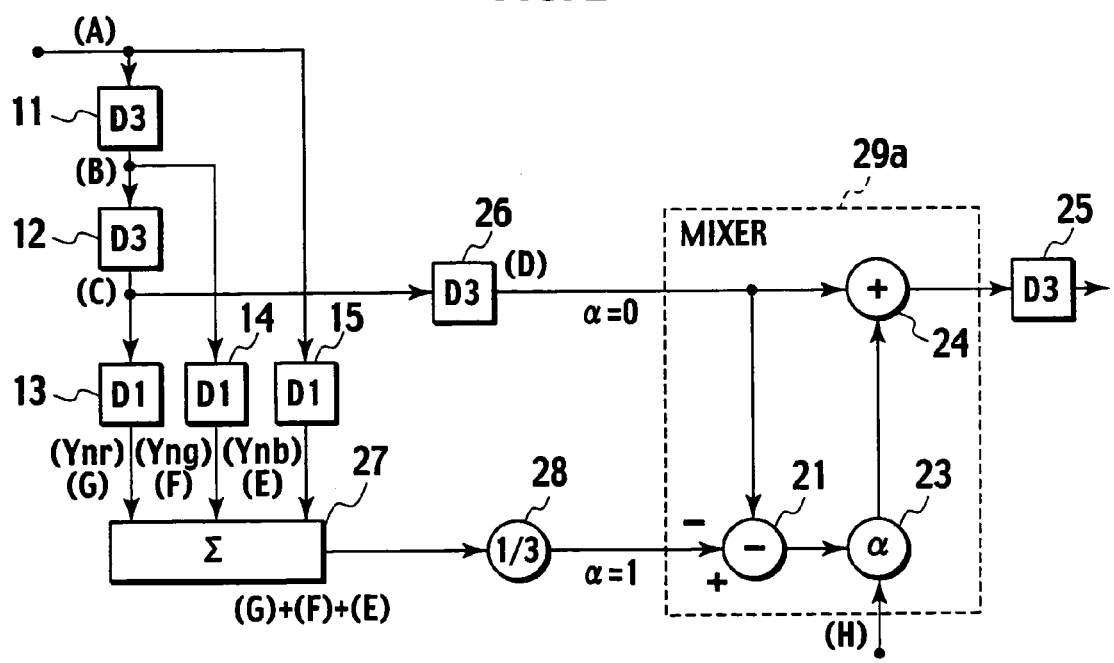
FIG. 21 is another functional block diagram explaining the filtering process executed by the pixel completion variable filter.

In the filtering process module shown in FIG. 21, the same reference symbols are affixed to the same constituent elements as those shown in FIG. 20. Here, (A) to (H) of FIG. 30 correspond to the signal data sequence at the locations shown by labeling (A) to (H) in FIG. 21 respectively.

The filtering process module shown in FIG. 21 includes the first delay units 11, 12, 25, 26, the second delay units 13, 14, 15, the summation unit 27, the subtracter 21, the multipliers 23, 28, and the adder 24. A mixer 29a is composed of the subtracter 21, the multiplier 23, and the adder 24. Like the first delay units 11, 12, the first delay unit 26 delays an input signal by the delay time D3.

The summation unit 27 calculates a total sum of the luminance signals output from the second delay units 13, 14, 15. The multiplier 28 multiplies the calculated total sum by ⅓ and then inputs the calculated result into the system $\alpha=1$ of the mixer 29a. The luminance signal output from the first delay unit 26 constitutes the signal data sequence shown in (D) of FIG. 30, and then is input into the system $\alpha=0$ of the mixer 29a.

The subtracter 21 subtracts the output luminance signal of the first delay unit 26 from the output luminance signal of the multiplier 28, and the multiplier 23 multiplies the luminance signal output from the subtracter 21 by the control value $\alpha$. The adder 24 adds the luminance signal that is multiplied by the control value α and the output luminance signal of the first delay unit 26, and then outputs the added result.

The mixer 29a consisting of the subtracter 21, the multiplier 23, and the adder 24 is obtained by deleting the multiplier 22 from the mixer 29 in FIG. 20. The mixer 29a mixes the signal data sequence of the subpixel sampling rate (2560 cpL herein), which is output from the first delay unit 26, and the signal data sequence of the display sampling rate (853 cpL herein), which is output from the multiplier 28 and in which the luminance signal of the subpixel rate is averaged in each pixel, according to the control value α.

Figure 22:
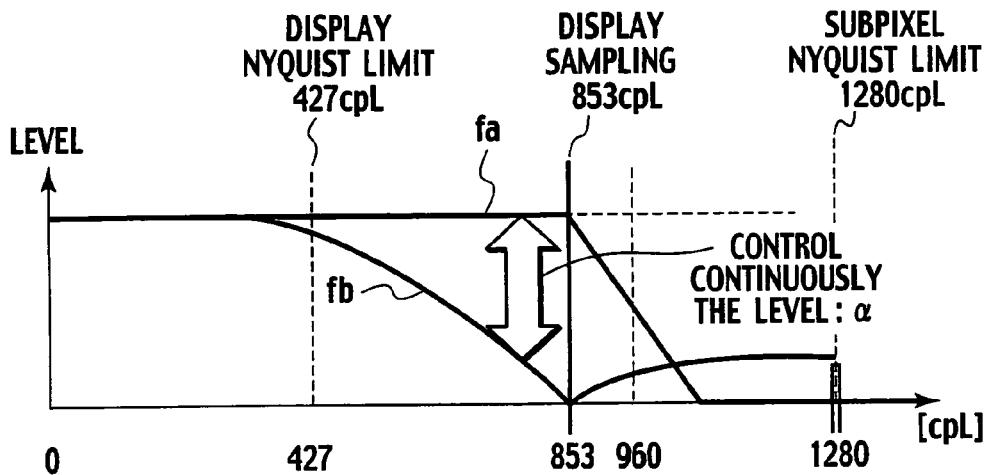
FIG. 22 is a view explaining a frequency characteristic of the pixel completion variable filter.

The frequency characteristics of the pixel completion variable filters realized by the filtering process modules in FIG. 19 and FIG. 20 are identical to each other. FIG. 22 shows the frequency characteristic of each pixel completion variable filter.

The frequency characteristic fa corresponds to a characteristic derived when α=0. At this time, since the luminance signal in itself that is subjected to the number-of-pixels conversion of subpixel is output, i.e., the signal data sequence of the subpixel sampling rate is output as it is, the frequency characteristic fa is extended toward the high frequency range. In contrast, the frequency characteristic fb corresponds to a characteristic derived when α=1. At this time, the filtering factors in units of pixel are given as (⅓, ⅓, ⅓), and the frequency characteristic fb becomes zero at 853 cpL that corresponds to the number of pixels of the display.

When the filtering factors in units of pixel are given as (⅓, ⅓, ⅓), the same filtering factor ⅓ is used in each subpixel in each pixel. Thus, the matrix coefficient balance is not upset in the matrix transformation of the [YUV→RGB] matrix transformer 6, and therefore any pseudo color interference is not generated.

Thus, the signal data sequence (frequency characteristic fa), in which the high resolution of the subpixel rate can be attained but sometimes the pseudo color interference is generated, and the signal data sequence (frequency characteristic fb), whose bandwidth is set within the range in which the pseudo color interference is not generated, can be mixed at the mixing rate that responds to the control value α. Therefore, the frequency characteristic of the pixel completion variable filter can be realized as a characteristic that is changed continuously between the frequency characteristics fa and fb according to the control value α.

As a result, the high-quality converted picture can be obtained by setting appropriately the control value α while suppressing the pseudo color interference.

The pixel completion variable filter is not limited to the above embodiments, and various embodiments may be considered. For instance, a process capable of attaining a desired frequency characteristic in units of pixel by applying the filtering process to the signal, which has been subjected to the pixel completion filtering process, using two pixels or more may be thought out.

Figure 23:
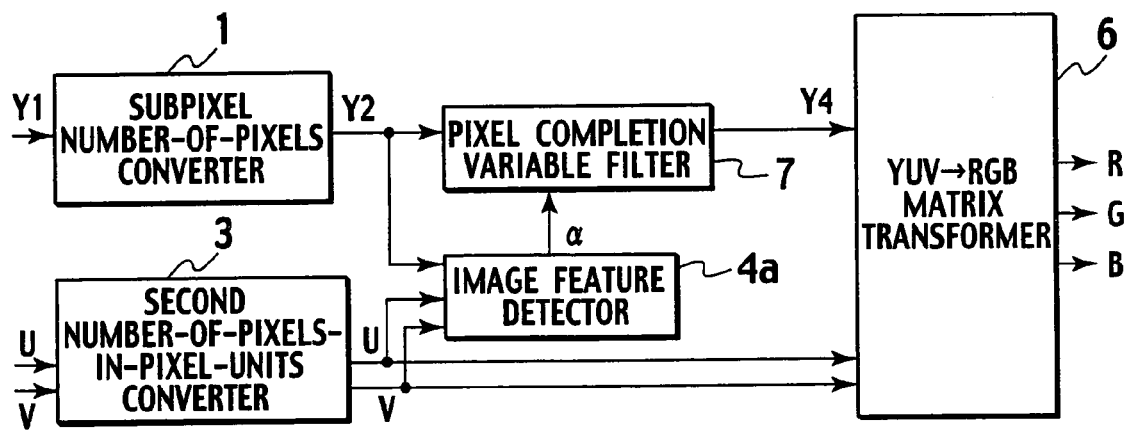
FIG. 23 is a block diagram showing a configuration of the sampling rate converting system according to the third embodiment of the present invention.

FIG. 23 is a block diagram showing a configuration of a sampling rate converting system according to the third embodiment of the present invention. In FIG. 23, the same reference symbols are affixed to the same constituent elements as those in the first embodiment shown in FIG. 10 or the second embodiment shown in FIG. 17.

The system according to the third embodiment includes the subpixel number-of-pixels converter 1, a pixel completion variable filter 7, the second number-of-pixels-in-pixel-units converter 3, the image feature detector 4a, and the [YUV→RGB] matrix transformer 6.

The subpixel number-of-pixels converter 1 converts the input high-definition luminance signal Y1 (1920 cpL herein) into the luminance signal Y2 of 2560 cpL shown in FIG. 6 and (D) of FIG. 7 by means of the number-of-pixels conversion of subpixel, and then outputs the converted signal. The second number-of-pixels-in-pixel-units converter 3 converts the input high-definition color difference signals U, V into the color difference signals U, V of 853 cpL by means of the number-of-pixels conversion in the prior art, and then outputs the converted signal. Here, as shown in FIG. 6, the output luminance signal Y2 of the subpixel number-of-pixels converter 1 and the output color difference signals U, V of the second number-of-pixels-in-pixel-units converter 3 are synchronized mutually in a three-to-one relationship.

The image feature detector 4a senses a particular waveform pattern, e.g., a location in which the pseudo color interference is generated, based on the output luminance signal Y2 after the number-of-pixels conversion of subpixel and the output color difference signals U, V of the second number-of-pixels-in-pixel-units converter 3, and then outputs the control value α based on the sensed result.

The pixel completion variable filter 7 variably controls the frequency characteristic of the pixel completion variable filter continuously between the frequency characteristics fa and fb according to the control value α output from the image feature detector 4a by executing the filtering process using the above pixel completion variable filter in FIG. 20 or FIG. 21. Thus, the frequency band of the input luminance signal Y2 after the number-of-pixels conversion of subpixel is changed to a frequency band in which generation of the pseudo color interference can be suppressed. Then, the pixel completion variable filter 7 outputs a luminance signal Y4 whose frequency band is changed.

The [YUV→RGB] matrix transformer 6 matrix-transforms the output luminance signal Y4 of the pixel completion variable filter 7 and the output color difference signals U, V of the second number-of-pixels-in-pixel-units converter 3 into the RGB signals, and then outputs the RGB signals to a display.

According to the sampling rate converting system shown in FIG. 23, in the pixel completion variable filter 7, the frequency characteristic of the pixel completion variable filter is variably controlled continuously between the frequency characteristics fa and fb according to the control value α obtained from the image feature detector 4a, and thus the frequency band of the input luminance signal Y2 after the number-of-pixels conversion of subpixel is changed. As a result, generation of the pseudo color interference can be suppressed.

Fourth Embodiment

Figure 24:
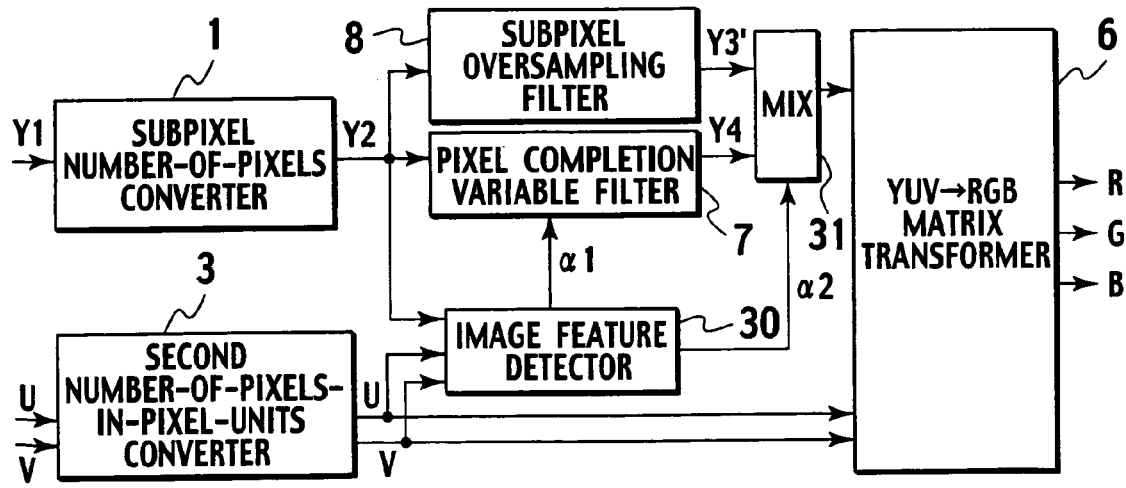
FIG. 24 is a block diagram showing a configuration of a sampling rate converting system according to a fourth embodiment of the present invention.

FIG. 24 is a block diagram showing a configuration of a sampling rate converting system according to the fourth embodiment of the present invention. In FIG. 24, the same reference symbols are affixed to the same constituent elements as those in the first embodiment shown in FIG. 10 or the second embodiment shown in FIG. 17.

The sampling rate converting system shown in FIG. 24 includes the subpixel number-of-pixels converter 1, the pixel completion variable filter 7, a subpixel oversampling filter 8, the second number-of-pixels-in-pixel-units converter 3, an image feature detector 30, a mixer (MIX) 31, and the [YUV→RGB] matrix transformer 6.

The image feature detector 30 senses a particular waveform pattern, e.g., a location in which the pseudo color interference is generated, based on the output luminance signal Y2 after the number-of-pixels conversion of subpixel and the output color difference signals U, V of the second number-of-pixels-in-pixel-units converter 3, and then outputs a control value α1 for the pixel completion variable filter 7 and a control value α2 for the mixer 31.

The pixel completion variable filter 7 executes the above filtering process by the pixel completion variable filter shown in FIG. 20, changes the frequency band of the input luminance signal Y2 after the number-of-pixels conversion of subpixel according to the control value α1, and outputs the luminance signal Y4, the frequency band of which is changed, to suppress the generation of the pseudo color interference.

The subpixel oversampling filter 8 suppresses the bandwidth of the output luminance signal Y2, and outputs the luminance signal Y3' having a frequency characteristic that is suppressed nearly up to the Nyquist limit 427 cpL of the display, for example.

The mixer 31 mixes the output luminance signal Y4 of the pixel completion variable filter 7 and the output luminance signal Y3' of the subpixel oversampling filter 8 acording to the control value α2, and then outputs the mixed luminance signal.

The [YUV→RGB] matrix transformer 6 matrix-transforms the output luminance signal of the mixer 31 and the output color difference signals U, V of the second number-of-pixels-in-pixel-units converter 3 into the RGB signals, and then outputs the RGB signals to the display.

Figure 25:
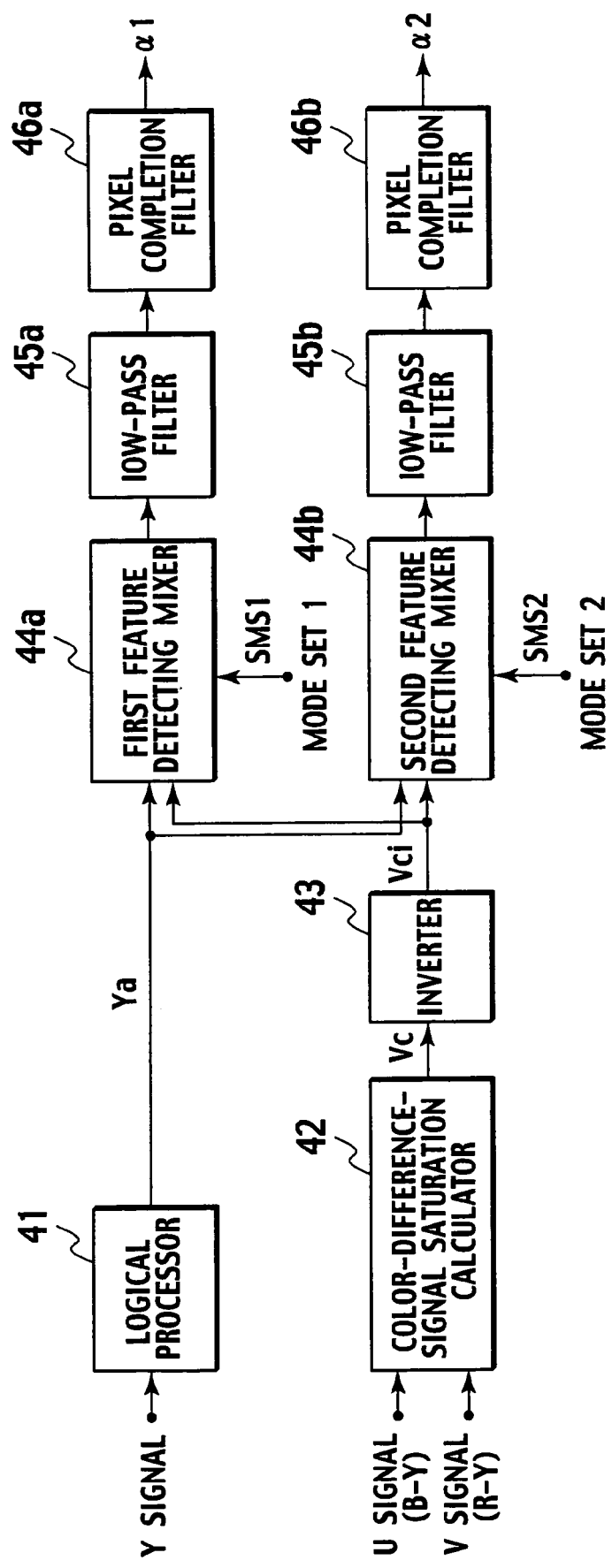
FIG. 25 is a block diagram showing a configuration of an image feature detector shown in FIG. 24.

FIG. 25 is a block diagram showing a configuration of the image feature detector 30. The image feature detector 30 includes the logical processor 41, the color-difference-signal saturation calculator 42, the inverter 43, first and second feature detecting mixers 44a, 44b, low-pass filters 45a, 45b, and pixel completion filters 46a, 46b. Respective constituent elements have basically the same functions as the constituent elements of the image feature detector 4 shown in FIG. 11.

The control values α1 and α2 are obtained as mixed values of the luminance signal Ya and the inverted saturation signal Vci based on respective mode setting signals SMS1, SMS2 that are input into the feature detecting mixers 44a, 44b respectively. If respective mode settings are equal, the control values α1 and α2 take the identical value.

Figure 26:
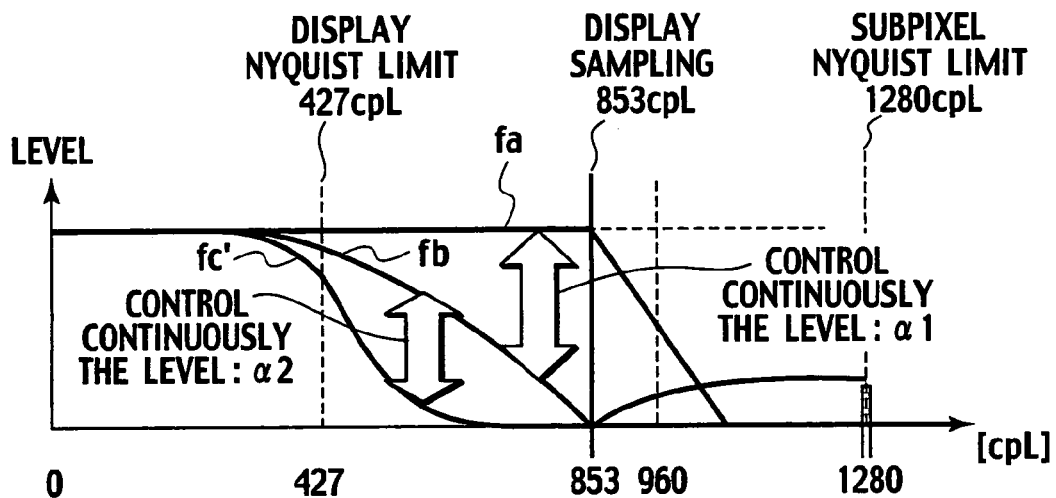
FIG. 26 is a view explaining a frequency characteristic of an output luminance signal in the system shown in FIG. 24.

FIG. 26 is a view explaining a frequency characteristic of the output luminance signal of the mixer 31. The frequency characteristics fa and fb are identical to the frequency characteristics fa and fb shown in FIG. 22 respectively. The frequency characteristic fc' is identical to the frequency characteristic fc' shown in FIG. 18.

The frequency characteristic of the output luminance signal of the mixer 31 are changed according to the control values α1 and α2. For example, such frequency characteristic coincides with the frequency characteristic fa when α1=0 and α2=0, such frequency characteristic coincides with the frequency characteristic fb when α1=1 and α2=0, and such frequency characteristic is equal to the frequency characteristic fc' when α2=1. In other words, the frequency characteristic of the luminance signal Y4 can be obtained as a frequency characteristic located between the frequency characteristics fa and fb by varying the control value α1 input into the pixel completion variable filter 7. In addition, a frequency characteristic located between the frequency characteristic of the luminance signal Y4 and the frequency characteristic fc' can be obtained by varying the mixing rate of the luminance signal Y4 and the luminance signal Y3' based on the control value α2. As a result, a high-quality converted picture can be obtained by setting appropriately the control values α1 and α2 while suppressing the pseudo color interference.

Fifth Embodiment

Figure 27:
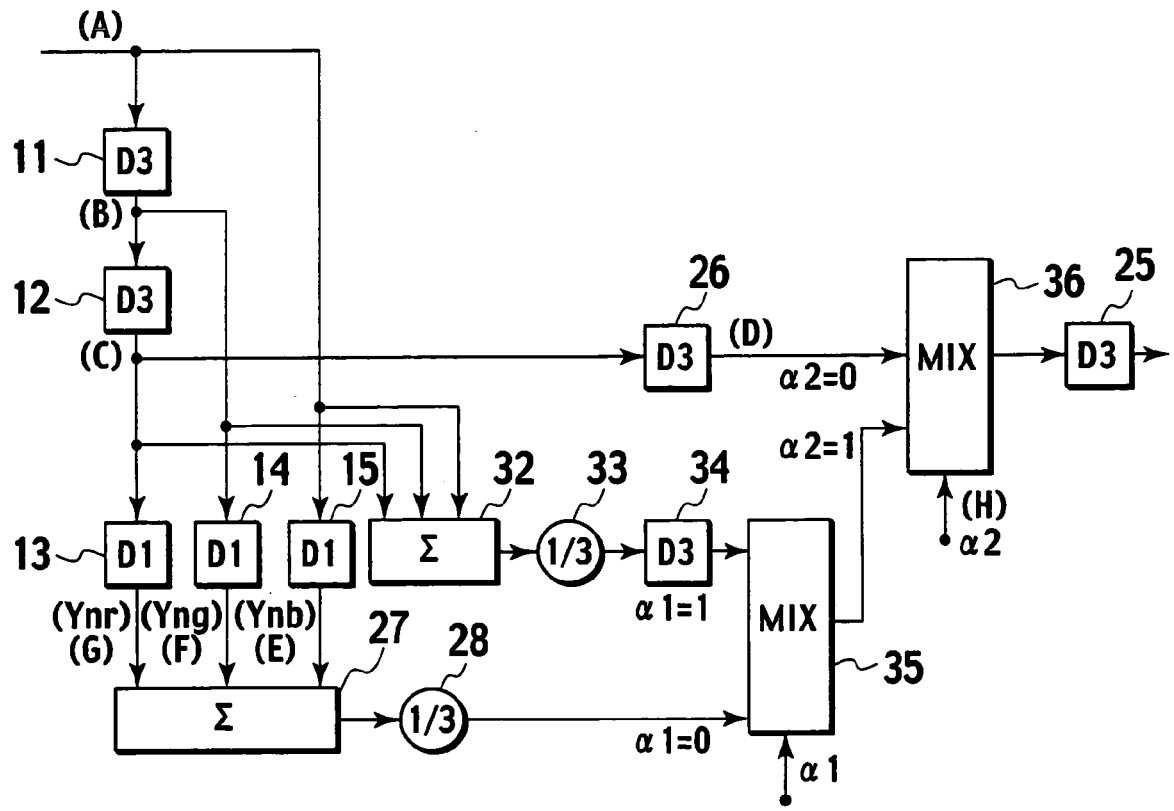
FIG. 27 is a functional block diagram explaining a filtering process that is applied to a sampling rate converting system according to a fifth embodiment of the present invention.

FIG. 27 is a functional block diagram explaining a filtering process that is applied to a sampling rate converting system according to the fifth embodiment of the present invention. In FIG. 27, the same reference symbols are affixed to the same constituent elements as those shown in FIG. 20 and FIG. 21. In this case, (A) to (H) of FIG. 30 correspond to the signal data sequences in (A) to (H) of FIG. 27 respectively.

The filtering process module shown in FIG. 27 includes the first delay units 11, 12, 25, 26, 34, the second delay units 13, 14, 15, the summation units 27, 32, the multipliers 28, 33, the first mixer 35, and the second mixer 36.

The multiplier 28 multiplies the total sum of the luminance signals calculated by the summation unit 27 by ⅓, and then inputs the multiplied luminance signal into the α1=0 side of the first mixer 35. Here, the output of the multiplier 28 corresponds to the output of the multiplier 28 in the pixel completion variable filter shown in FIG. 21, and is equivalent to the component that is mixed with the output luminance signal after the number-of-pixels conversion of subpixel.

Meanwhile, the summation unit 32 calculates a total sum of the luminance signals of the signal data sequences shown in (A) to (C) of FIG. 30, and the multiplier 33 multiplies the total sum of the luminance signals output from the summation unit 32 by ⅓. The first delay unit 34 delays the output luminance signal of the multiplier 33 by the period CK3, and then inputs the delayed luminance signal into the α1=1 side of the first mixer 35. Now, the summation unit 32, the multiplier 33, and the first delay unit 34 gives a simplest example that acts similarly to the subpixel oversampling filter 8 shown in FIG. 17 and FIG. 24. In other words, the filtering factor of the filter consisting of the summation unit 32, the multiplier 33, and the first delay unit 34 is given as (⅓), (⅓), (⅓), and the summation unit 32, the multiplier 33, and the first delay unit 34 act as a weighted mean filter. In this case, the filter connected to the α1=1 side of the first mixer 35 is not limited to the above filter consisting of the summation unit 32, the multiplier 33, and the first delay unit 34. The normal filter to get a desired frequency characteristic may be employed. This filter is not a filter that outputs an identical value in one pixel, i.e., a completion filter whose filtering process is not executed to spread over plural pixels, but a filter that convolutes merely the signal data sequences shown in (A) to (C) of FIG. 30 and whose filtering process is executed to spread over plural pixels.

The first mixer 35 mixes the output luminance signal being input into the α1=0 system from the multiplier 28, i.e., the output luminance signal that is subjected to the filtering process by the pixel completion filter, and the output luminance signal being input into the α1=1 system from the first delay unit 34, i.e., the luminance signal that is subjected to the filtering process by the subpixel oversampling filter, based on the control value α1. The first mixer 35 has a function equivalent to the above mixer 5. Therefore, the frequency characteristic of the output luminance signal of the first mixer 35 is given as a characteristic located between the characteristics fb and fc' shown in FIG. 29 according to the control value α1. The first mixer 35 inputs the mixed luminance signal into the α2=1 side of the second mixer 36.

The system consisting of the first delay units 11, 12, 26 acts as a system that pass the luminance signal, which is subjected to the number-of-pixels conversion of subpixel, therethrough while maintaining its broadband signal as it is. Then, first delay unit 26 inputs the luminance signal of the signal data sequence shown in (D) of FIG. 30 into the α2=0 side of the second mixer 36.

The second mixer 36 also has a function equivalent to the first mixer 35. Therefore, the frequency characteristic of the luminance signal output from the second mixer 36 is given as a characteristic located between the frequency characteristic of the output signal of the first mixer 35 and the characteristic fa in FIG. 29 according to the control value α2.

Figure 28:
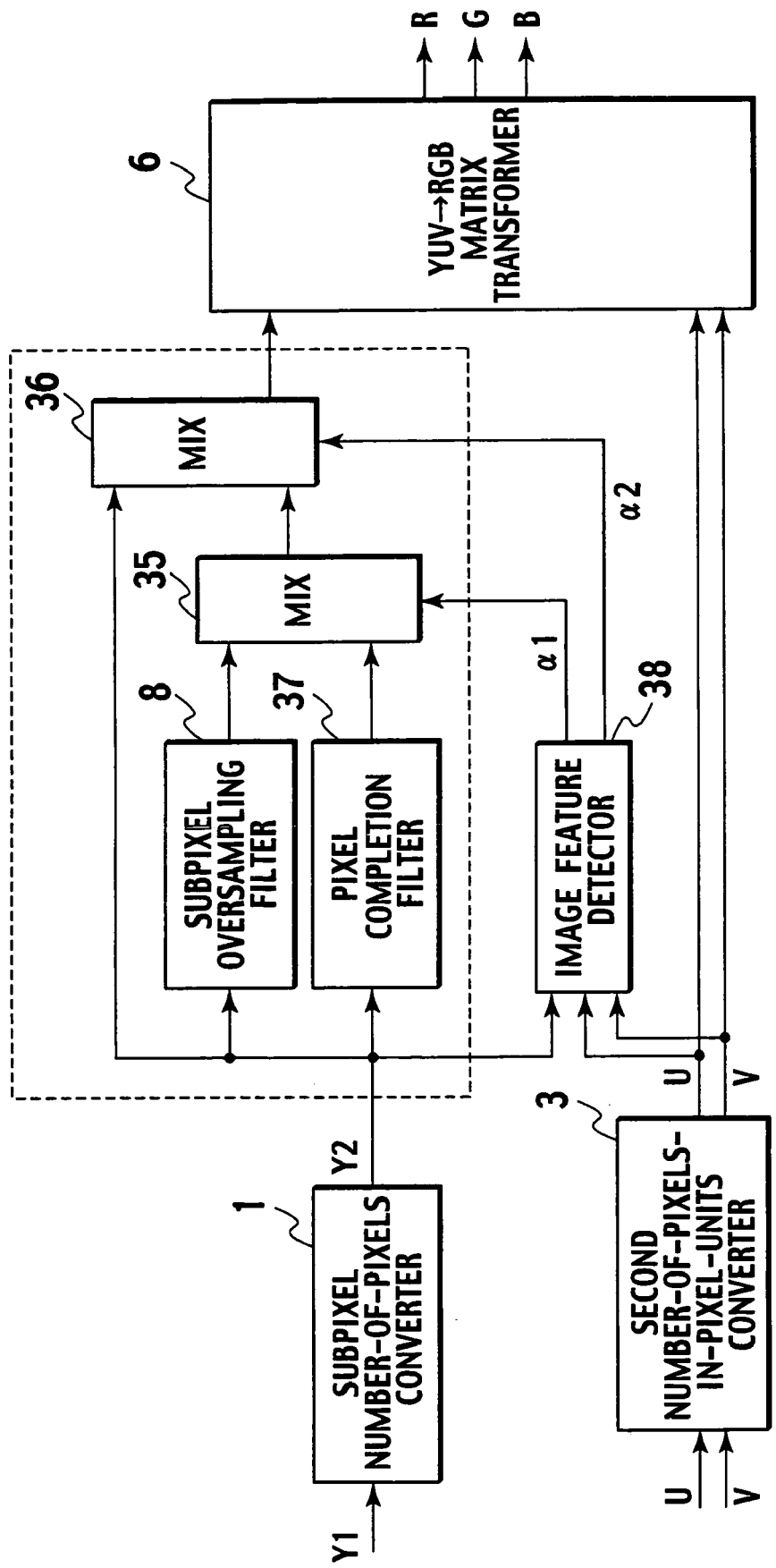
FIG. 28 is a block diagram showing a configuration of the sampling rate converting system according to the fifth embodiment of the present invention.

FIG. 28 is a block diagram showing a configuration of a sampling rate converting system according to the fifth embodiment of the present invention. In FIG. 28, the same reference symbols are affixed to the same constituent elements as those in the first embodiment.

The system shown in FIG. 28 includes the subpixel number-of-pixels converter 1, a pixel completion filter 37, the subpixel oversampling filter 8, the second number-of-pixels-in-pixel-units converter 3, the image feature detector 38, the first mixer 35, the second mixer 36, and the YUV→RGB matrix transformer 6.

The image feature detector 38 is constructed similarly to the foregoing image feature detector 30, and senses a particular waveform pattern, e.g., a location where the pseudo color interference is easily recognized, based on the output luminance signal Y2 after the number-of-pixels conversion of subpixel and the output color difference signals U, V of the second number-of-pixels-in-pixel-units converter 3, and then outputs the control value α1 for the first mixer 35 and the control value α2 for the second mixer 36 based on the sensed result.

The portion within a broken line in FIG. 28 corresponds to the filtering process module in FIG. 27. More particularly, the pixel completion filter 37 corresponds to the second delay units 13, 14, 15, the summation unit 27, and the multiplier 28, and also the subpixel oversampling filter 8 corresponds to the summation unit 32, the multiplier 33, and the first delay unit 34.

The [YUV→RGB] matrix transformer 6 matrix-transforms the output luminance signal of the second mixer 36 and the output color difference signals U, V of the second number-of-pixels-in-pixel-units converter 3 into the RGB signals, and then outputs the RGB signals to the display.

Figure 29:
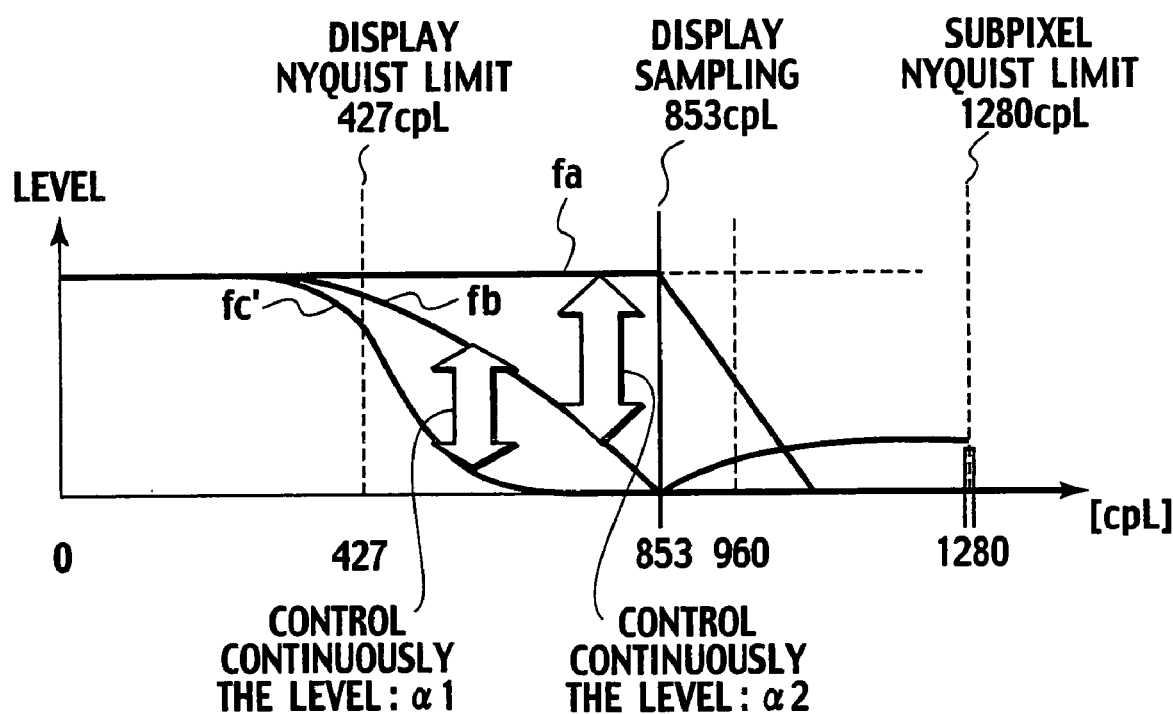
FIG. 29 is a view explaining a frequency characteristic of an output luminance signal in the system shown in FIG. 28.

FIG. 29 is a view explaining a frequency characteristic of the output luminance signal of the second mixer 36. The frequency characteristics fa and fb are same as the frequency characteristics fa and fb in FIG. 22 respectively, and the frequency characteristic fc' is same as the frequency characteristic fc' in FIG. 18.

According to the sampling rate converting system shown in FIG. 28, the luminance signal of the frequency characteristic fb, which is derived by applying an averaging process to the output luminance signal Y2, is output from the pixel completion filter 37, and the luminance signal of the frequency characteristic fc', whose bandwidth is suppressed such that the bandwidth of the output luminance signal Y2 is narrower than the frequency characteristic fb, is output from the subpixel oversampling filter 8. Then, these luminance signals are mixed by the first mixer 35, and the mixing rate is controlled variably according to the control value α1. In addition, the output luminance signal of the first mixer 35 and the output luminance signal Y2 of the frequency characteristic fa are mixed by the second mixer 36, and the mixing rate is controlled variably according to the control value α2.

Therefore, a frequency characteristic located between the frequency characteristics fc' and fa is obtained according to the control values α1 and α2, and thus a high-quality converted picture can be obtained while suppressing generation of the pseudo color interference.

In this case, the present invention is not limited to the above embodiments, and can be varied. For instance, in the above embodiments, the number of subpixel in one pixel is set to 3, i.e., R(red), G(green), B(blue). But 4 subpixels or more may be employed by adding one primary color such as an emerald color, or the like, for example. In case the number of subpixel in one pixel is set to 4, the filtering factor of the luminance signal corresponding to each subpixel in the above pixel completion variable filter is given as

| output sampling point | $(1/4) + (3/4) \times (1 - \alpha)$ |
|---|---|
| output non-sampling point | $(1/4) \times \alpha$ | and three output non-sampling points are given. Even though the control value α has any value in the range of 0 to 1, a total value becomes 1 when the filtering factors of three output non-sampling points and the filtering factor of one output sampling point are summed up.

This condition can be generalized as follows. In case the number of subpixel in one pixel is Sn, the filtering factor is given as

| output sampling point | $(1/Sn) + ((Sn - 1)/Sn) \times (1 - \alpha)$ |
|---|---|
| output non-sampling point | $(1/Sn) \times \alpha$ | and the number of the output sampling points is always set to 1 and the number of the output non-sampling points is given by (Sn−1). Even though the control value α has any value in the range of 0 to 1, a total value becomes 1 when the filtering factors of (Sn−1) output non-sampling points and the filtering factor of one output sampling point are summed up.

At this time, if the control value α is 1, all filtering factors become 1/Sn and the factors become identical for all the subpixels. Therefore, such an effect can be achieved that the color balance is not upset in the matrix transformation. As a result, the effect to prevent the generation of the pseudo color interference can be achieved at all times even when the number of subpixels is changed.

Even if the filtering factors α and (1−α) of the output sampling point and the output non-sampling point are exchanged mutually, the pixel completion variable filter may execute the filtering process in answer to such exchange. Accordingly, since the same effect as that achieved before the exchange can be achieved, the filtering process applied after the filtering factors α and (1−α) of the output sampling point and the output non-sampling point are exchanged is not particularly different from the filtering process applied before the exchange.

This is similarly true of the control value α that is input into the above mixers. Even if the inputs to respective mixers are exchanged mutually (for example, not α but (1−α) is input as the control value), respective mixers may control the mixture in response to the exchange. Therefore, the similar effect can be achieved.

Figure 31:
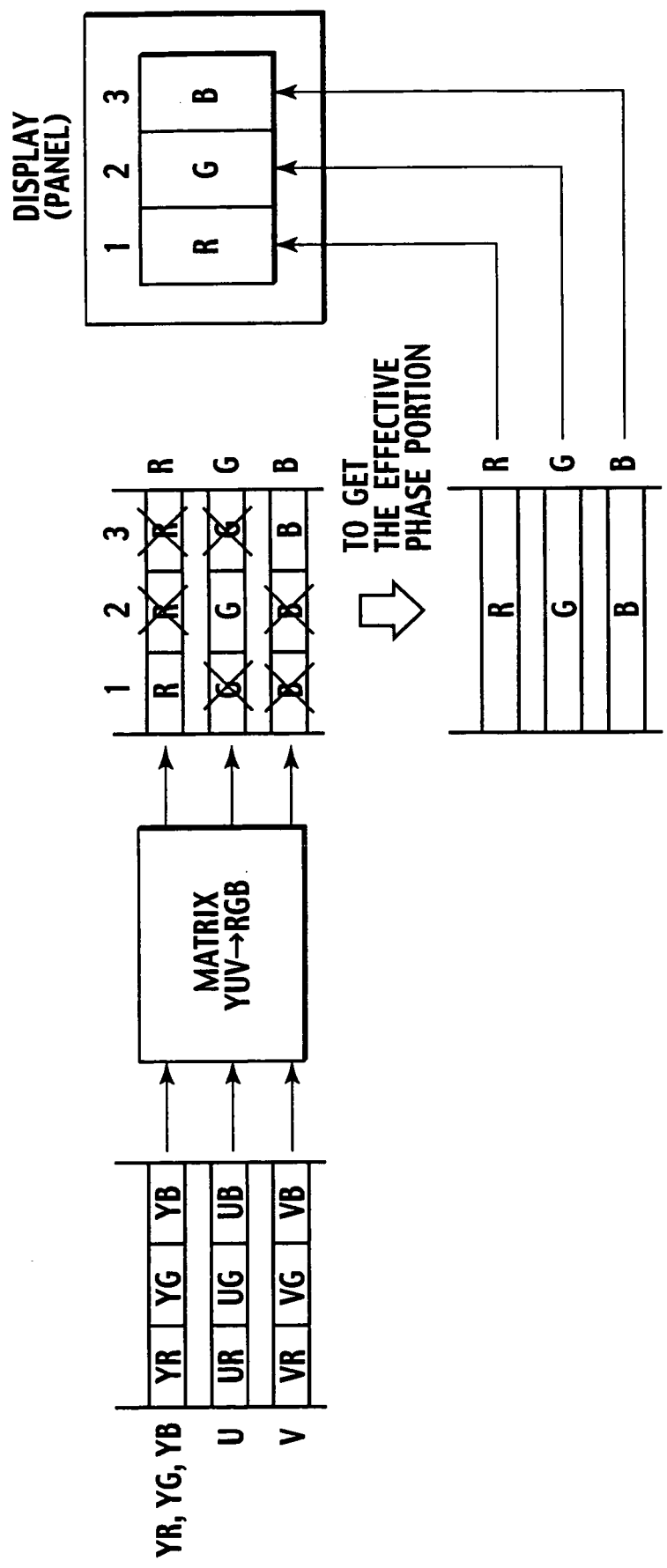
FIG. 31 is a view explaining an example in which the number-of-pixels conversion of subpixel is applied to color difference signals as well as the luminance signals.

In the above embodiments, in the television transmission signal, since normally the bandwidth of the U, V color difference signals is narrower than the bandwidth of the Y luminance signal, the number-of-pixels conversion of subpixel is applied only to the Y luminance signal. In this event, as shown in FIG. 31, the number-of-pixels conversion of subpixel may be applied also to the U, V color difference signals. Here, the luminance signal and the color difference signals, which are subjected to the number-of-pixels conversion of subpixel, are transformed into the RGB primary color signals by the [YUV→RGB] matrix transformer. At this time, like the [YUV→RGB] matrix transformation shown in FIG. 8, the RGB primary color signals have three phase values per one pixel, the phase corresponding to the RGB subpixel arrangement order in one pixel of the display on a one-to-one basis among them serves as an effective phase, and the signal in the effective phase portion gives each subpixel data. In other words, the signals in the effective phase portions in the RGB primary color signals, which are derived from the luminance signal and the color difference signals of the subpixel sampling rate by the [YUV→RGB] matrix transformation, are converted into the primary color signals of the number-of-pixels rate.

In the above embodiments, the RGB subpixels are aligned in the horizontal direction in the display, but the RGB subpixels may be aligned in the vertical direction. The present invention can also be applied to this case. Also, the present invention can also be applied to the case where the RGB subpixels are aligned two-dimensionally in a display. In addition, if the filtering process is completed within one pixel, the filtering method of the present invention can be applied thereto and thus the similar effect can be achieved.

It should be understood that many modifications and adaptations of the invention will become apparent to those skilled in the art and it is intended to encompass such obvious modifications and changes in the scope of the claims appended hereto.

What is claimed is:

1. A sampling rate converting system for executing a conversion of a sampling rate of an image signal input into such a display that respective pixels each consisting of a plurality of subpixels are arranged in a matrix fashion and also respective pixels emit a light in response to a signal data corresponding to respective pixels to reproduce a luminance or a color every pixel, the system comprising:

a subpixel number-of-pixel converter that inputs a high-definition luminance signal of a high-definition image signal whose number of pixels is larger than a number of pixels of the display, and outputs a subpixel sampling rate signal by converting a sampling rate of the high-definition luminance signal into a subpixel sampling rate based on a sampling rate in a direction along which the subpixels on the display are aligned and a number of subpixels constituting the pixel;

a number-of-pixels-in-pixel-units converter that inputs the high-definition luminance signal, and applies a number-of-pixels converting process to the input high-definition image signal in units of pixel to output an interference suppressing signal;

an image feature detector that senses a particular waveform pattern of a luminance signal or color difference signals constituting the high-definition image signal to output a control signal; and a mixer that mixes the subpixel sampling rate signal and the interference suppressing signal and controls a mixing rate thereof according to the control signal.

2. A sampling rate converting system according to claim 1, wherein the image feature detector includes a feature signal generating unit that generates a feature signal according to a level of the luminance signal and a degree of saturation of the color difference signals, and a filtering processing unit that outputs the control signal by applying the filtering process to the feature signal output from the feature signal generating unit.

3. A sampling rate converting system according to claim 2, wherein the feature signal generating unit generates the feature signal such that the mixing rate of the interference suppressing signal in the mixer is increased as the level of the luminance signal is increased and the degree of saturation of the color difference signals is decreased.

4. A sampling rate converting system for executing a conversion of a sampling rate of an image signal input into such a display that respective pixels each consisting of a plurality of subpixels are arranged in a matrix fashion and also respective pixels emit a light in response to a signal data corresponding to respective pixels to reproduce a luminance or a color every pixel, the system comprising:

a subpixel number-of-pixel converter that inputs a high-definition luminance signal of a high-definition image signal whose number of pixels is larger than a number of pixels of the display, and outputs a subpixel sampling rate signal by converting a sampling rate of the high-definition luminance signal into a subpixel sampling rate based on a sampling rate in a direction along which the subpixels on the display are aligned and a number of subpixels constituting the pixel;

a subpixel oversampling filter that applies a filtering process to the subpixel sampling rate signal at the subpixel sampling rate to output an interference suppressing signal;

an image feature detector that senses a particular waveform pattern of a luminance signal or color difference signals constituting the high-definition image signal to output a control signal; and a mixer that mixes the subpixel sampling rate signal and the interference suppressing signal and controls a mixing rate thereof according to the control signal.

5. A sampling rate converting system according to claim 4, wherein the image feature detector includes a feature signal generating unit that generates a feature signal according to a level of the luminance signal and a degree of saturation of the color difference signals, and a filtering processing unit that outputs the control signal by applying the filtering process to the feature signal output from the feature signal generating unit.

6. A sampling rate converting system according to claim 5, wherein the feature signal generating unit generates the feature signal such that the mixing rate of the interference suppressing signal in the mixer is increased as the level of the luminance signal is increased and the degree of saturation of the color difference signals is decreased.

7. A filtering method applied to a sampling rate converting system that executes a conversion of a sampling rate of an image signal input into such a display that respective pixels each consisting of a plurality of subpixels are arranged in a matrix fashion and also respective pixels emit a light in response to a signal data corresponding to respective pixels to reproduce a luminance or a color every pixel, the method comprising:

generating a subpixel sampling rate signal by converting a sampling rate of a high-definition luminance signal of a high-definition image signal, whose number of pixels is larger than a number of pixels of the display, into a subpixel sampling rate based on a sampling rate in a direction along which the subpixels on the display are aligned and a number of subpixels constituting the pixel;

calculating a weighted mean signal of the subpixel sampling rate signal in units of pixel;

generating an output signal by mixing the subpixel sampling rate signal and the weighted mean signal; and controlling a filtering characteristic by changing a rate of the mixture.

* * * * *